(12) United States Patent
Geigel et al.

(10) Patent No.: US 7,340,676 B2
(45) Date of Patent: Mar. 4, 2008

(54) SYSTEM AND METHOD FOR AUTOMATIC LAYOUT OF IMAGES IN DIGITAL ALBUMS

(75) Inventors: Joseph M. Geigel, Pittsford, NY (US); Alexander C. Loui, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 1309 days.

(21) Appl. No.: 09/750,858

(22) Filed: Dec. 29, 2000

(65) Prior Publication Data

US 2002/0122067 A1 Sep. 5, 2002

(51) Int. Cl.
*G06F 3/00* (2006.01)

(52) U.S. Cl. .............. 715/716; 715/804; 715/853; 715/732; 715/788; 715/815

(58) Field of Classification Search ............. 345/776, 345/804, 853, 854; 715/517, 716, 804, 854, 715/853, 732, 788, 815; 707/3
See application file for complete search history.

(56) References Cited

U.S. PATENT DOCUMENTS

| | | | | |
|---|---|---|---|---|
| 5,685,002 A * | 11/1997 | Sano | .............. | 715/517 |
| 5,911,146 A | 6/1999 | Johari et al. | | |
| 6,014,458 A * | 1/2000 | Wang | .............. | 382/176 |
| 6,202,061 B1 * | 3/2001 | Khosla et al. | .............. | 707/3 |
| 6,222,947 B1 * | 4/2001 | Koba | .............. | 382/284 |
| 6,324,545 B1 * | 11/2001 | Morag | .............. | 707/202 |
| 6,366,918 B1 * | 4/2002 | Guttman et al. | .............. | 707/100 |
| 6,571,054 B1 * | 5/2003 | Tonomura et al. | .............. | 386/95 |
| 2001/0019630 A1 * | 9/2001 | Johnson | .............. | 382/232 |

FOREIGN PATENT DOCUMENTS

| | | | |
|---|---|---|---|
| EP | 0 860 797 A2 | 8/1998 | |
| EP | 0 929 184 A2 | 7/1999 | |

OTHER PUBLICATIONS

"Artificical Evolution for Computer Graphics" by Karl Sims. Computer Graphics, vol. 25, No. 4, Jul. 1991, pp. 319-328.

(Continued)

*Primary Examiner*—Weilun Lo
*Assistant Examiner*—Mylinh Tran
(74) *Attorney, Agent, or Firm*—Robert L. Walker

(57) ABSTRACT

A system and method for automatic creation of digital image albums. A Page Creator Module utilizes a genetic engine and a layout evaluation module. The genetic engine evolves a group of images to a plurality of album pages, based on certain layout criteria. The evaluation module calculates layout criteria and compares them with user preferences. When an acceptable image/page layout has been generated, the image/page assignments are transferred to an Image Placement Module. The Image Placement Module utilizes a second genetic engine, which evolves various criteria to generate page layouts genetic structures. These structures define the location, scale, and rotation of images placed on a given page. A layout evaluation module calculates and compares these layouts with certain other preferences and page requirements. When a suitable layout has been generated, a final album output is generated, which may be displayed, printed, or otherwise transferred for subsequent utilization.

22 Claims, 18 Drawing Sheets

OTHER PUBLICATIONS

"Tree Visualization with Tree-Maps: 2-d Space-Filling Approach" by Ben Shneiderman. ACM Transactions on Graphics, vol. 11, No. 1, Jan. 1992, pp. 92-99.

"A Generic Polygon Clipping Library" by Alan Murta. Department of Computer Science, Univeristy of Manchester, 1999. http://www.cs.man.ac.uk/~amurta/software/index.html.

Extensible Markup Language (XML). http://www.w3.org/XML/.

"Pattern Classification", Second Edition, Richard Duda, Peter Hart, David Stork, John Wiley & Sons, Inc., New York, p. 378, 2001.

Toshiyuki Masui, "Graphic Object Layout With Interactive Genetic Algorithms" Visual Languages, 1992. Proceedings., 1992 IEEE Workshop on Seattle, WA, USA Sep. 15-18, 1992, Los Alamitos, CA, USA, IEEE Comput. Soc., US, Sep. 1992 (Sep. 15, 1992). pp. 74-80. XP010094594, ISBN: 0-8186-3090-6.

Cesare Alippi et al., "Cluster Partitioning in Image Analysis Classification: A Genetic Algorithm Approach", Proceedings of the Annual European Conference on Computer Systems and Software Engineering (COMPEURO). The Hague, May 4-8, 1992, Los Alamitos, IEEE Comp. Soc. Press, US, vol. Conf. 6, May 4, 1992 (May 4, 1992), pp. 139-144, XP010028428, ISBN: 0-8186-2760-3.

\* cited by examiner

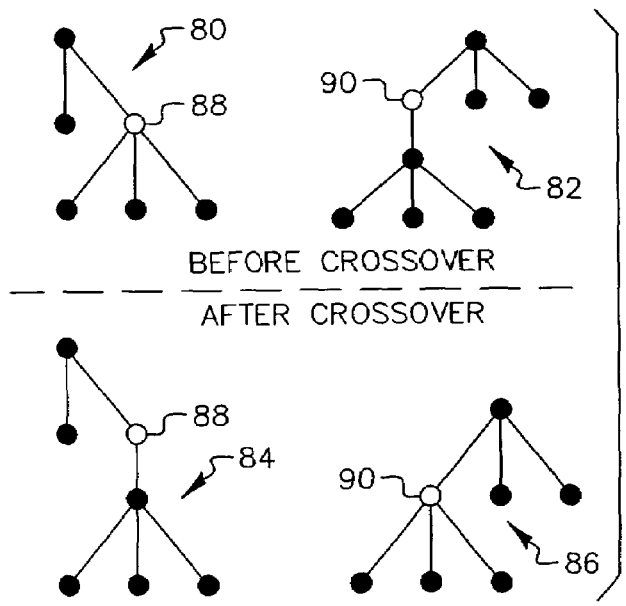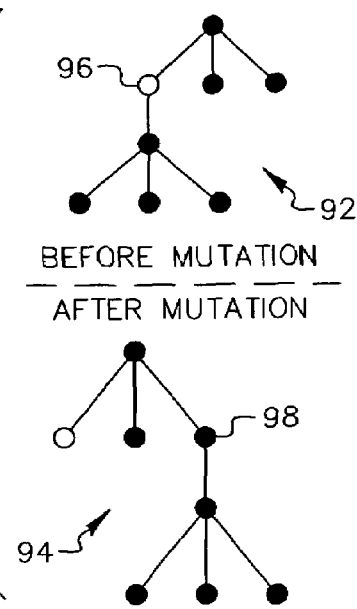
FIG. 3  FIG. 4
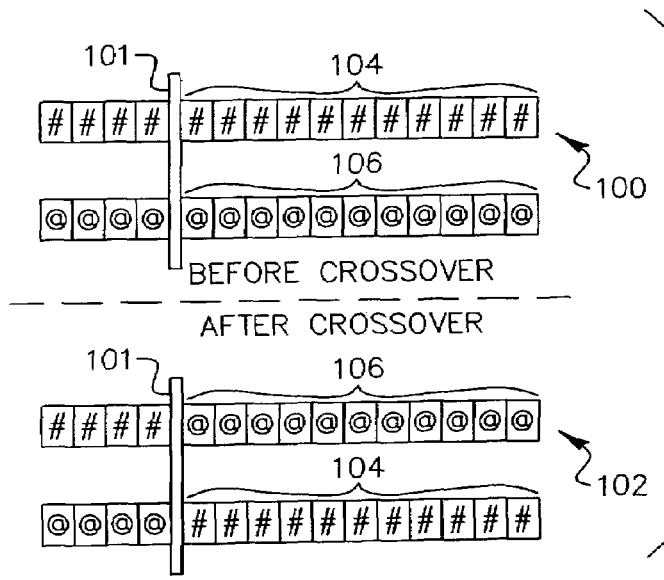
FIG. 5
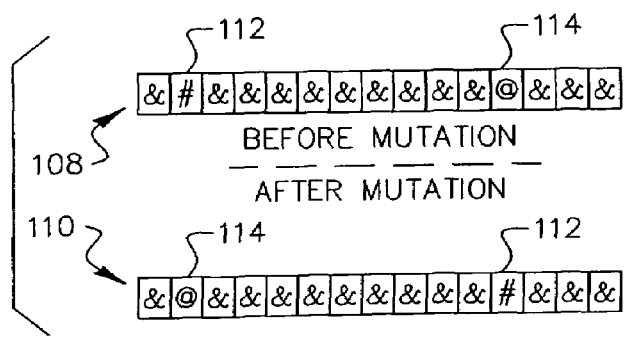
FIG. 6

| PAGE 1 | C: 39 E: 0.4 | | | | — 220 |
|---|---|---|---|---|---|

| PAGE 2 | C: 19 E: 0.56 | — 222 |
|---|---|---|

| PAGE 3 | C: 15 E: 0.54 | — 224 |
|---|---|---|

| PAGE 4 | C: 17 E: 0.6 | — 226 |
|---|---|---|

| PAGE 5 | C: 20 E: 0.42 | — 228 |
|---|---|---|

| PAGE 6 | C: 37 E: 0.4 | C: 38 E: 0.33 | — 230 |
|---|---|---|---|

| PAGE 7 | C: 35 E: 0.9 | — 232 |
|---|---|---|

| PAGE 8 | C: 36 E: 0.5 | — 234 |
|---|---|---|

| PAGE 9 | C: 21 E: 0.49 | C: 24 E: 0.5 | C: 28 E: 0.28 | — 236 |
|---|---|---|---|---|

| PAGE 10 | C: 23 E: 0.5 | — 238 |
|---|---|---|

| PAGE 11 | C: 25 E: 0.36 | — 240 |
|---|---|---|

| PAGE 12 | C: 22 E: 0.27 | — 242 |
|---|---|---|

| PAGE 13 | C: 5 E: 0.55 | C: 7 E: 0.58 | C: 10 E: 0.28 | — 244 |
|---|---|---|---|---|

| PAGE 14 | C: 0 E: 0.75 | C: 6 E: 0.4 | — 246 |
|---|---|---|---|

— 248

| C: 1 E: 0.67 | C: 2 E: 0.8 | C: 3 E: 0.34 | C: 4 E: 0.43 | C: 8 E: 0.58 |
|---|---|---|---|---|
| C: 9 E: 0.34 | C: 11 E: 0.28 | C: 12 E: 0.6 | C: 13 E: 0.49 | C: 14 E: 0.49 |
| C: 16 E: 0.46 | C: 18 E: 0.45 | C: 26 E: 0.5 | C: 27 E: 0.54 | C: 29 E: 0.7 |
| C: 30 E: 0.76 | C: 31 E: 0.62 | C: 33 E: 0.52 | C: 34 E: 0.9 | PAGE 15 |

| PAGE 16 | C: 32 E: 0.54 | — 250 |
|---|---|---|

*FIG. 12*

PAGE 1 | C:18 E:0.45 | — 252
PAGE 2 | C:13 E:0.49 | C:29 E:0.7 | — 254
PAGE 3 | C:1 E:0.67 | C:3 E:0.34 | C:23 E:0.5 | — 256
PAGE 4 | C:2 E:0.8 | C:33 E:0.52 | — 258
PAGE 5 | C:30 E:0.76 | C:37 E:0.4 | — 260
PAGE 6 | C:25 E:0.36 | C:32 E:0.54 | — 262
PAGE 7 | C:0 E:0.75 | C:36 E:0.5 | — 264
PAGE 8 | C:12 E:0.6 | C:21 E:0.49 | C:38 E:0.33 | — 266
PAGE 9 | C:17 E:0.6 | C:27 E:0.54 | — 268
PAGE 10 | C:4 E:0.43 | C:7 E:0.58 | C:15 E:0.54 | — 270
PAGE 11 | C:19 E:0.56 | C:20 E:0.42 | C:26 E:0.5 | — 272
PAGE 12 | C:11 E:0.28 | C:16 E:0.46 | C:39 E:0.4 | — 274
PAGE 13 | C:34 E:0.9 | C:35 E:0.9 | — 276
PAGE 14 | C:5 E:0.55 | C:9 E:0.34 | C:24 E:0.5 | — 278
PAGE 15 | C:8 E:0.58 | C:22 E:0.27 | C:31 E:0.62 | — 280
PAGE 16 | C:14 E:0.49 | C:28 E:0.28 | — 282
PAGE 17 | C:6 E:0.4 | C:10 E:0.28 | — 283

*FIG. 13*

| PAGE 1 | C:13 E:0.49 | C:31 E:0.62 | — 284
| PAGE 2 | C:16 E:0.46 | C:21 E:0.49 | C:29 E:0.7 | C:33 E:0.52 | — 286
| PAGE 3 | C:3 E:0.34 | C:4 E:0.43 | C:26 E:0.5 | C:38 E:0.33 | — 288
| PAGE 4 | C:35 E:0.9 | — 290
| PAGE 5 | C:5 E:0.55 | C:15 E:0.54 | — 292
| PAGE 6 | C:2 E:0.8 | — 294
| PAGE 7 | C:34 E:0.9 | — 296
| PAGE 8 | C:12 E:0.6 | C:32 E:0.54 | — 298
| PAGE 9 | C:9 E:0.34 | C:10 E:0.28 | C:11 E:0.28 | C:20 E:0.42 | C:25 E:0.36 | — 300
| PAGE 10 | C:7 E:0.58 | C:27 E:0.54 | — 302
| PAGE 11 | C:8 E:0.58 | C:19 E:0.56 | — 304
| PAGE 12 | C:17 E:0.6 | C:24 E:0.5 | — 306
| PAGE 13 | C:14 E:0.49 | C:30 E:0.76 | — 308
| PAGE 14 | C:1 E:0.67 | C:18 E:0.45 | — 310
| PAGE 15 | C:23 E:0.5 | C:28 E:0.28 | C:37 E:0.4 | — 312
| PAGE 16 | C:22 E:0.27 | C:36 E:0.5 | C:39 E:0.4 | — 314
| PAGE 17 | C:0 E:0.75 | C:6 E:0.4 | — 316

*FIG. 14*

PAGE 1 | C:36 E:0.5 | — 318
PAGE 2 | C:37 E:0.4 | C:38 E:0.33 | — 320
PAGE 3 | C:12 E:0.6 | C:16 E:0.46 | — 322
PAGE 4 | C:17 E:0.6 | — 324
PAGE 5 | C:15 E:0.54 | C:19 E:0.56 | — 326
PAGE 6 | C:35 E:0.9 | — 328
PAGE 7 | C:2 E:0.8 | — 330
PAGE 8 | C:3 E:0.34 | C:7 E:0.58 | C:10 E:0.28 | — 332
PAGE 9 | C:4 E:0.43 | C:5 E:0.55 | C:8 E:0.58 | — 334
PAGE 10 | C:13 E:0.49 | C:14 E:0.49 | C:18 E:0.45 | C:20 E:0.42 |
— 336
PAGE 11 | C:21 E:0.49 | C:25 E:0.36 | C:28 E:0.28 |
— 338
PAGE 12 | C:26 E:0.5 | C:27 E:0.54 | — 340
PAGE 13 | C:22 E:0.27 | C:23 E:0.5 | C:24 E:0.5 | — 342
PAGE 14 | C:1 E:0.67 | C:9 E:0.34 | C:11 E:0.28 | — 344
PAGE 15 | C:0 E:0.75 | C:6 E:0.4 | — 346
PAGE 16 | C:32 E:0.54 | C:33 E:0.52 | — 348
PAGE 17 | C:31 E:0.62 | — 350
PAGE 18 | C:30 E:0.76 | — 352
PAGE 19 | C:29 E:0.7 | — 354
PAGE 20 | C:34 E:0.9 | — 356
PAGE 21 | C:39 E:0.4 | — 358

*FIG. 15*

PAGE 1 | C:0 E:0.75 | C:1 E:0.67 | C:2 E:0.8 — 362

PAGE 2 | C:3 E:0.34 | C:4 E:0.43 | C:5 E:0.55 — 364

PAGE 3 | C:6 E:0.4 | C:8 E:0.58 — 366

PAGE 4 | C:7 E:0.58 | C:9 E:0.34 | C:27 E:0.54 — 368

PAGE 5 | C:10 E:0.28 | C:11 E:0.28 | C:12 E:0.6 — 370

PAGE 6 | C:13 E:0.49 | C:14 E:0.49 | C:15 E:0.54 — 372

PAGE 7 | C:16 E:0.46 | C:17 E:0.6 | C:18 E:0.45 — 374

PAGE 8 | C:19 E:0.56 | C:20 E:0.42 | C:21 E:0.49 | C:22 E:0.27 — 376

PAGE 9 | C:23 E:0.5 | C:24 E:0.5 | C:25 E:0.36 | C:26 E:0.5 — 378

PAGE 10 | C:28 E:0.28 | C:29 E:0.7 — 380

PAGE 11 | C:30 E:0.76 | C:31 E:0.62 | C:33 E:0.52 | C:34 E:0.9 — 382

PAGE 12 | C:35 E:0.9 | C:36 E:0.5 | C:37 E:0.4 — 384

PAGE 13 | C:32 E:0.54 | C:38 E:0.33 | C:39 E:0.4 — 386

SYSTEM AND METHOD FOR AUTOMATIC LAYOUT OF IMAGES IN DIGITAL ALBUMS

BACKGROUND OF THE INVENTION

1. Field of the Invention

The invention relates generally to software. More particularly, the present invention relates to software for creating digital photo albums.

2. Description of the Related Art

Modem photography is moving into the digital age. Even though a large part of the market for photography still utilizes conventional film and processing, the ability to obtain digital files from conventional film is rapidly adapting the conventional film market into the digital image arena. In addition, with the broad acceptance of digital cameras, as well as broad utilization of digital images in Internet applications, the volume of commercial and consumer produced digital image files has increased dramatically in recent years. Suppliers now routinely deliver digital image files to users. Such files may be delivered on storage media, like photo CD's and so forth, or may be delivered via the Internet or through e-mail. The provision of digital images in an organized format, including the preparation of digital image photo albums, is now available in the marketplace, as consumers desire to receive and present their images in a most favorable light. However, there has yet to be introduced an automated system that presents digital images in sophisticated creatively composed fashions.

There presently exist several software applications, which assist the user in manual creation of digital photo albums. In general, these applications provide the user with a straightforward means of accomplishing the basic task of image organization and page layout, so called 'albuming'. The drawback with such applications is that they require a large amount of user interaction, which does not yield much improvement over the conventional, paper based albuming techniques of the past. Therefore, the task is less likely to be completed due to the significant amount of effort required to accomplish it.

Automated albuming systems that offer limited automated layout functions are known in the art. Eastman Kodak Company has developed digital graphic album applications, such as the Kodak Picture Page software, which allow a user to organize digital graphics images into album pages. Typically, users organize images by dates and times, places, subject and so forth. Such software allows the user to annotate the images by entering text, or other data, describing the image. One common approach to automated layout is the use of templates. In this approach, predefined layouts with empty areas are filled in with user images. Thus, the size, placement, rotation, and framing of the images on the page are predetermined. A user or system merely needs to specify which images should be placed in which empty area to complete an album page. This approach is also widely used by many graphic layout design tools (such as Quark) and by Kodak® PicturePage® Software. Templates provide a straightforward and working solution to the layout problem. However, this solution is somewhat limiting as the choice of layouts is bounded by the collection of available templates. Variation in page layout design can only be achieved by the addition of new templates.

The real challenge in automatic generation of page layouts is allowing a level of creativity in the layouts produced. With the introduction of scrapbooking as a social activity, there has been a recent resurgence of interest in capturing memories and telling stories using scrapbooks. The albums produced by people in these communities can range from extremely basic, where images are laid out using a fixed grid or template, to extremely complex, where images are seemingly scattered randomly on a page. In such layouts, it is very difficult to define, in an objective fashion, what the layout approach is.

Consequently, a need exists in the art for an automated system and/or method of organizing and generating album and page layouts of digital images.

SUMMARY OF THE INVENTION

The need in the art is addressed by the systems and methods of the present invention. The Automatic Albuming System taught by the present invention is unique, in part, because it produces album pages automatically with minimal input from the user. In an illustrative embodiment, a digital image album layout system is taught. The system comprises a page creator module that has a first genetic engine operable to execute genetic evolution calculations on a first genetic population of image criteria. The page creator module also has a page evaluation module that is operable to test the first genetic population for fitness to album preference criteria. The system also has an image placement module with a second genetic engine that is operable to execute genetic evolution calculations on a second genetic population of page layout criteria. The image placement module also has a layout evaluation module that is operable to test the second genetic population for fitness to page preference criteria.

The present invention teaches an automated album layout method. The method involves the use of a set of inputs including digital images, graphics, and other 2-dimensional objects. The inventive method comprises the steps of evaluating a grouping of the image objects for distribution into a number of album pages according to a fitness function's parameters of a genetic engine and, assigning each image object to a page based on user preferences, including at least one of: balance, emphasis, chronology, and unity. Then, the page is displayed for user viewing and distribution refining the based on further user action.

The present invention also teaches an automated layout and presentation method responsive to a set of inputs containing digital images, graphics, and other two-dimensional objects. This method comprises the steps of evaluating the 'x' and 'y' position coordinates, scale and rotation of each of the input images objects within a page according to fitness function parameters in a genetic engine. Then, a page layout is created based on user preferences including at least one of: white space, overlap, rotation, spatial balance, rotational balance, border symmetry, and emphasis. Then, the page layout is displayed for user viewing, and refining the page layout based on further user action. Finally, the page layout is formatted for printing.

In an illustrative embodiment, a system for assigning images to album pages is taught. The system includes a mechanism for specifying an initial set of image page assignments to a genetic population and a genetic engine operable to evolve the genetic population to produce a present set of image page assignments. The system also includes a page evaluation module operable to test the present set of image page assignments according to an album fitness function to determine an album score and a mechanism for outputting the present set of image page assignments if the album score meets an album threshold value.

In another illustrative embodiment, a system for arranging images on an album page is taught. This system includes a mechanism for specifying an initial set of image placement parameters to a genetic population and a genetic engine operable to evolve the genetic population to produce a present set of image placement parameters. The system also includes a layout evaluation module, operable to test the present set of image placement parameters with a page fitness function to determine a page score, and a mechanism for outputting the image placement parameters if the page score meets a page threshold value.

BRIEF DESCRIPTION OF THE DRAWINGS

FIG. 3 is a tree diagram of a genetic crossover in an illustrative embodiment of the present invention.

FIG. 4 is a tree diagram of a genetic mutation in an illustrative embodiment of the present invention.

FIG. 5 is an array diagram of a genetic crossover in an illustrative embodiment of the present invention.

FIG. 6 is an array diagram of a genetic mutation in an illustrative embodiment of the present invention.

FIG. 12 is a page layout example according to an illustrative embodiment of the present invention.

FIG. 13 is a page layout example according to an illustrative embodiment of the present invention.

FIG. 14 is a page layout example according to an illustrative embodiment of the present invention.

FIG. 15 is a page layout example according to an illustrative embodiment of the present invention.

FIG. 16 is a page layout example according to an illustrative embodiment of the present invention.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The principle objective of albuming automation is to automate the album production process using various image science algorithms and techniques. The final step of this automated process is to layout images within an album in a manner pleasing to the user.

The present invention teaches an innovative and flexible system for automatic album page layout that makes advantageous use of genetic algorithms. The system is divided into two modules, a Page Creator Module which is responsible for distributing images amongst various album pages and an Image Placement Module which positions images on individual pages. Each module incorporates basic graphic design principles such as balance, emphasis, rhythm, and unity, in determining fitness for page layout solutions.

A complete albuming automation system utilizes various image science algorithms and techniques including advanced event clustering, dud detection, image appeal and automatic page layout. In an illustrative embodiment, the emphasis of such a system is for a "DAFY" (Do-it-All-For-You) like product, where the user inputs a collection of images and the system produces an album (a collection of images) with minimal input from the user. It will be understood by those of ordinary skill in the art, that the term 'images' encompasses a much broader scope than the conventional photograph, even though the album concept stems from the traditional photographic album. In the modem digital world, images include computer generated graphics, bitmaps, photographs, computer altered photographs, video still frames, scanned images, various forms or artwork, text, background materials, and even video clips, animation, and computer generated time variant materials.

Figure 1:
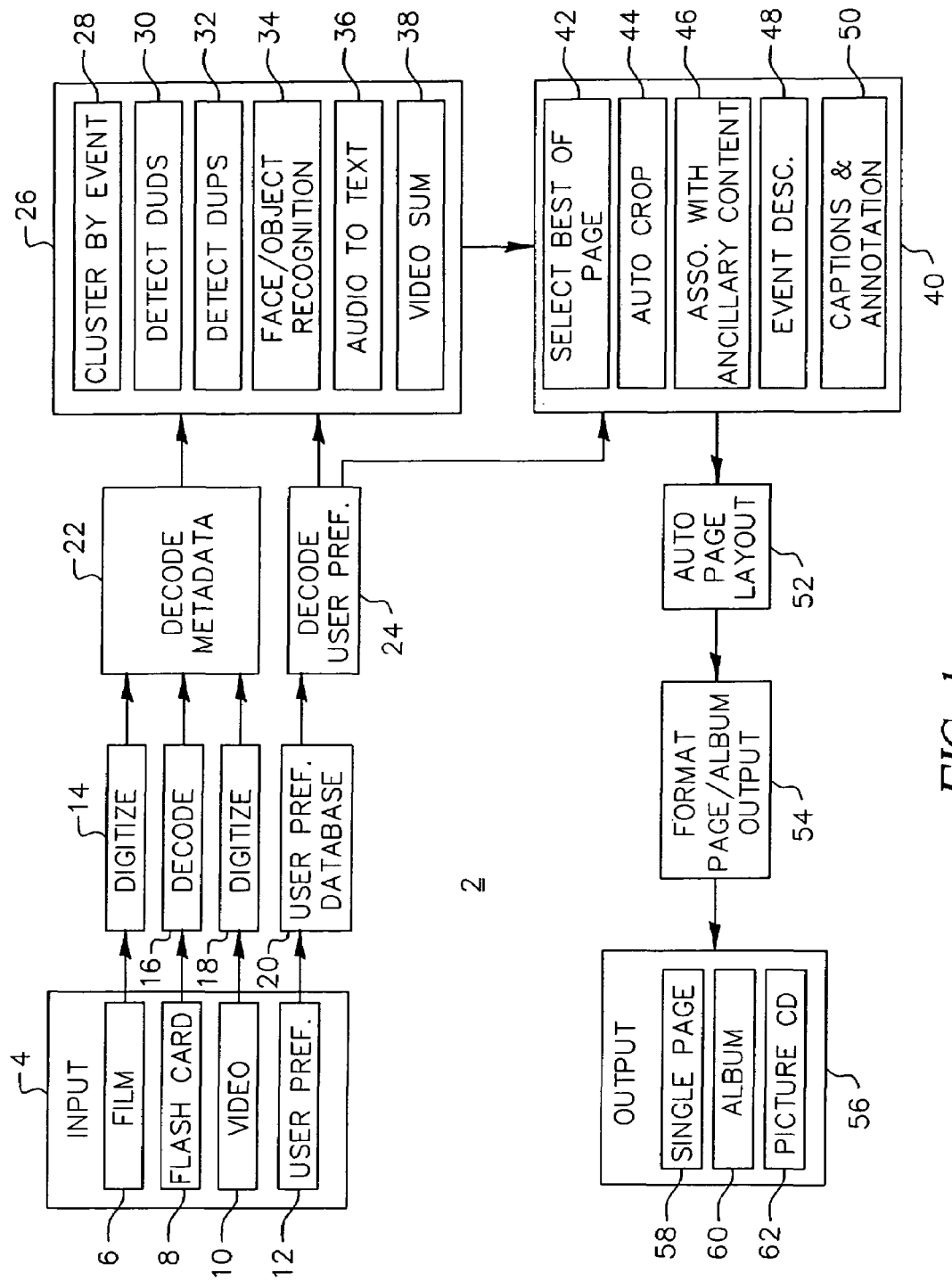
FIG. 1 is an overview diagram of an Albuming Automation System in an illustrative embodiment of the present invention.

An overall functional diagram of an illustrative embodiment Albuming Automation System ('AAS') 2 is depicted in FIG. 1. One important function of the AAS 2 is to layout images within an album page. This function is the last major operation before an album page can be rendered for display, printing, or transfer to any another medium. In the illustrative embodiment of FIG. 1, the AAS 2 receives input 4 from one of a variety of image sources, which includes conventional film 6, flash memory cards 8, video media 10, and other images sources as are understood by those of ordinary skill in the art. Another basic input to the AAS 2 is the user specified preferences 12, which will be more filly discussed hereinafter. Film 6 input is first digitized 14 for subsequent processing. Flash memory card media 8 is decoded 16. Video media 10 is also digitized 18. Once a common digital format is established, the image information is processed to recover any metadata information 22 that may be available. Metadata can be found in Internet originated images, and may be supplied by the Internet or other individual. For example, APS cameras allow for inclusion of metadata related to the date and time the image was taken, the image format, and other technical parameters related to the exposure of the image. User preferences 12 are stored in a user preference database 20 and are subsequently decoded 24 for use in processing the user preferences along with the image information. By maintaining a database of user preferences, subsequent use of the system by a particular user can be made more efficient and convenient. The system is able to recall the user preferences and apply them to new batches of images, and can offer the user an opportunity to amend previous preferences as well.

The core processing of the AAS 2 includes several functions 26 that discriminate images and information for subsequent page layout. These include clustering of images by event 28, detection of dud images 30, detection of duplicate images 32, recognition of facial features and certain other objects 34, audio to text conversion 36, and video summarization 38. The reduced and refined image information is then coupled to a second group of core process functions 40 that further refine the image content information. These functions include selection of the best image per page 42, automatic image cropping 44, association of particular images with ancillary content 46, association with event description information 48, and association with caption and annotation information 50. The refined image information is coupled to the automatic page layout process 52, which will be more fully described hereinafter. Page layout data is coupled to an output format module 54 that further organizes the output from the automatic page layout module 52. Finally, the output of the AAS 2 is produced at module 56 in the form of single page images 58, entire albums of images 60, Picture CD media, or other photo delivery media as are understood by those of ordinary skill in the art.

The present invention teaches a flexible system for generation of album page layouts. The system makes use of genetic algorithms, a class of search and optimization algorithms that are based on the concepts of biological evolution. For a more detailed reference to genetic algorithms, see; J. Holland, *Adaptation in Natural and Artificial Systems*. The University of Michigan Press, Ann Arbor, 1975, and, D. Goldberg, *Genetic Algorithms in Search, Optimization, and Machine Learning*, Addison-Wesley, 1989, the contents of which are hereby incorporated by reference thereto. The system is comprised of two major modules, the first that distributes images amongst a set of album pages, and the second that positions the images on each individual page. These modules are called the Page Creator Module and the Image Placement Module respectively. Each module takes a genetic approach to its task.

The overall function of the Page Layout System 124 is straightforward. Given a set of images to be placed in an album, a page layout algorithm must distribute the images amongst a set of pages and then layout the images on each individual page. Working within the framework of the AAS, the following information is available to the page layout system 124 on an image by image basis:

Event Clustering—Images are grouped by event and sub-event

Dud/Duplicate Detection—Duplicate and dud detection are performed on the images prior to being submitted to the page layout system. Thus, the list of images supplied as input to the page layout process represent all the images that will be contained within the final album.

Emphasis/Image Appeal—Images have an associated image appeal or emphasis value. This value is a measure of relative importance and is be used as a guide in determining the emphasis that an image will be given when placing it on an album page.

Chronology—The chronology of the images to be placed in the album is known.

The page layout system 124 performs two separate, yet equally important tasks. Page creation 126, given a set of images, the system distributes these images amongst a set of album pages, such that each image is assigned a page upon which the image will appear. And, image placement 132, once the images have been assigned to pages, each individual page is laid out by positioning the images assigned to it. Therefore, for each image, placement, rotation, and scaling of the image on the page are assigned.

With regard to album layout according to the present invention, an important advantage is that the Automated Albumimg System produces albums that more closely resemble scrapbooks as opposed to a simple collection of pictures. Achieving this goal in an automated fashion is a significant accomplishment because the means by which creative scrapbookers generate page layouts for their albums is usually not easily expressed in an objective fashion. The creation of a scrapbook is primarily a subjective and artistic task. Few, if any, concrete rules exist in the scrapbook generation process, and those that do, tend to be individual based on personal preferences. The subjective nature of creative page layout poses a real challenge to any page layout system. In particular, template based layout approaches are somewhat limiting since the range of possibilities for a page layout are bounded by the collection of available templates.

The present invention employs a novel approach to page layout by employing genetic algorithms, which are a class of adaptive methods that can be used to solve search and optimization problems involving large search spaces. The search is performed using a simulated evolution (survival of the fittest). These algorithms maintain and manipulate "generations" of potential solutions or "populations". With each generation, the best solutions (as determined by a problem specific fitness function) are genetically manipulated to form the solution set for the following generation. As in real evolution, solutions can be combined (via mating/crossover) or undergo random mutation. In addition, inferior solutions can, by chance, survive from generation to generation.

Figure 2:
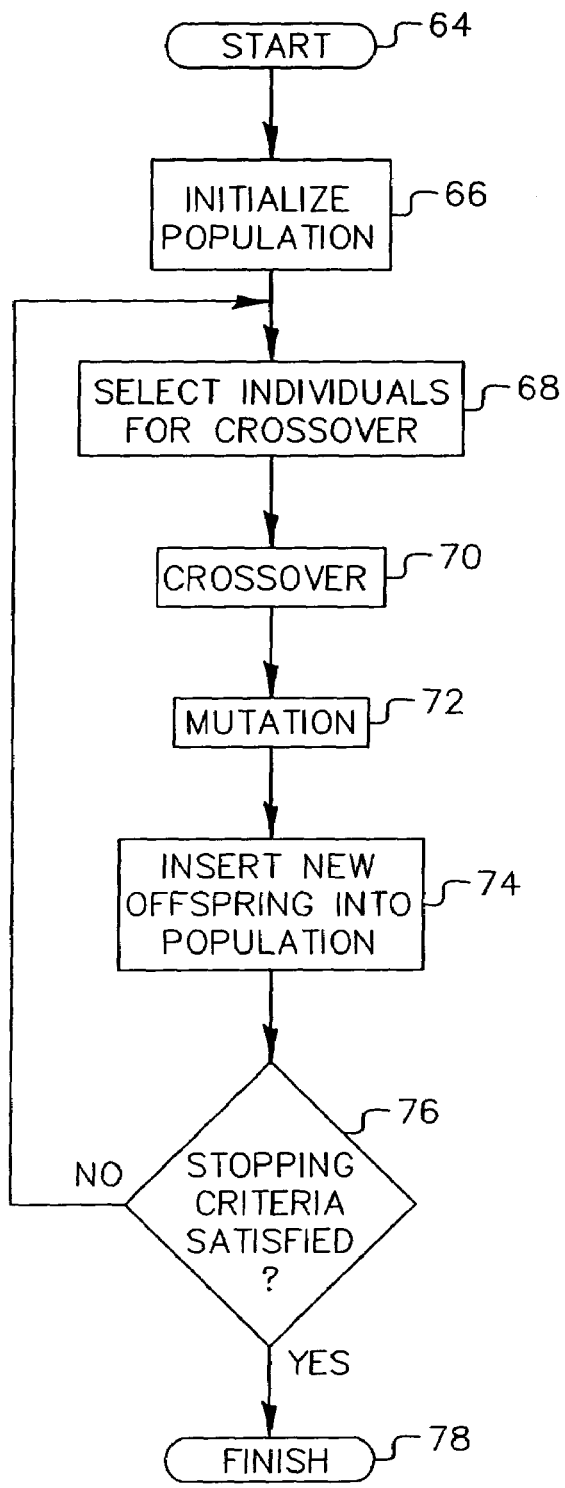
FIG. 2 is a flow chart of a genetic algorithm process in an illustrative embodiment of the present invention.

The genetic algorithm search process is performed in an iterative manner as illustrated in FIG. 2. The process starts at step 64, and then an initial population of solutions is generated at step 66. This initialization is typically done through random placement of the image population, although there is nothing prohibiting in using some sort of heuristic for this process. Once a population is established, individual solutions are judged at step 68 based on a fitness function and suitable individuals are chosen for mating and mutation. Next, at steps 70 and 72, crossover and mutation are performed on the chosen solution, resulting in a number of new individuals in the population. These new individuals are generated using the genetic operators of mutation, step 70, and crossover, step 72. A new generation of solutions is then created from these newly generated offspring by inserting them into the population at step 74. It is noted that there are a number of different variants used when constructing a new generation of solutions. In some cases, individuals chosen for mating and mutation are included in this next generation of solutions. Note also, that unlike biological mating, new solutions can be generated from the crossover of two or more suitable individuals. The process is iterated until a defined stopping criterion is met at step 76, in which case the process finishes at step 78. The stopping criteria will be more filly discussed hereinafter.

When applying a genetic algorithm to a given problem, three major tasks must be performed:

1) Coding—Genetic algorithms maintain populations of problem solutions. During implementation, these solutions are represented by some sort of data structure. The data structure used by a genetic algorithm is known as a genome. In the coding task, a data structure is chosen to represent the genome for the problem space and a mapping from the data structure fields to the problem domain is established. Common genome data structures used in genetic algorithms includes lists, arrays, and trees.

2) Definition of Genetic Operators—New solutions are created via crossover and mutation of individuals from previous generations. Given a particular genome structure, the means for performing these operations must be defined. During crossover, one or more children solutions are derived from two or more parents. With mutation, new individuals are generated by mutation of a single solution. There are standard crossover and mutation operators available for genomes encoded using commonly used data structures like lists, arrays, and trees.

3) Fitness—The most challenging and application specific task in applying genetic algorithms to a problem domain is in the definition of a fitness function. The fitness function is responsible for judging individual solutions and returning a score based on its evaluation. In essence, the fitness function defines the difference between a good solution to a problem and a bad one. Much care must be taken in defining the fitness function, as the genetic algorithm will converge on solutions deemed "fit" by this function.

FIG. 3 illustrates a genetic crossover operation for trees 80 and 82. For the crossover operation, random nodes 88, 90 are selected for each parent and the sub-tree from these chosen nodes are swapped. This results in the 'after crossover' trees 84 and 86, and the illustration demonstrates the change that occurs. Similarly, FIG. 4 illustrates a genetic mutation operation for tree 92. Nodes from the tree 96 and 98 are randomly chosen, then swapped. Tree 94 illustrates the change from tree 92 when this swap occurs.

FIG. 5 and FIG. 6 illustrate similar genetic crossover and mutation operators, but in the case of an array type data structure. In FIG. 5, for a crossover, a position 101 within the array 100 is randomly selected and the array values 104 and 106 after the chosen position 101 are swapped between the two parents, resulting in crossover array 102. Similarly, in FIG. 6, two random array elements 112 and 114 are selected within a single parent 108 and their respective positions are swapped to produce resultant array 110.

An impetus to using genetic algorithms for page layout came from an application for creating artistic textures. This source was Karl Sims who uses genetic algorithms for creating 2D textures as articulated in the reference; Karl Sims, "*Artificial Evolution for Computer Graphics*", Proceedings of SIGGRAPH '91, pp 319-328, the contents of which are hereby incorporated by reference thereto. The motivations behind his work was mostly artistic whereby the artist directly determined the fitness of each solution by visual inspection. The system allowed for random exploration of the texture space with solutions converging based on the likes and dislikes of the artist.

Page layout has also been found to be more of an artistic task rather than a mechanical one. Genetic algorithms are appropriate for such artistic tasks since, unlike other more brute force algorithms, the genetic algorithm does not attempt to mimic or model any particular process by which solutions are created. Instead, solutions are generated randomly and are evaluated after the fact. This is analogous to the way creative scrapbookers approach the layout problem. While scrapbookers can't usually explain the process by which they generated their page layouts, they certainly know a good layout when they see one.

The layout problem has a multidimensional problem space. Considering the image distribution task discussed herein before, there are at least four parameters that must determined for each image that is to be positioned on a page. These are the 'x' and 'y' positions, the rotation angle of each image, and the size scaling of each image. Multiplying that by the number of images to be placed results in a solution space ranging from four dimensions, in the case of a single image to be placed, to as high as forty dimensions, in the case of ten images to be placed. Genetic algorithms have been proven successful for problems with similarly large dimensional solution spaces, hence they are suitable for automatic albuming system applications.

Figure 7:
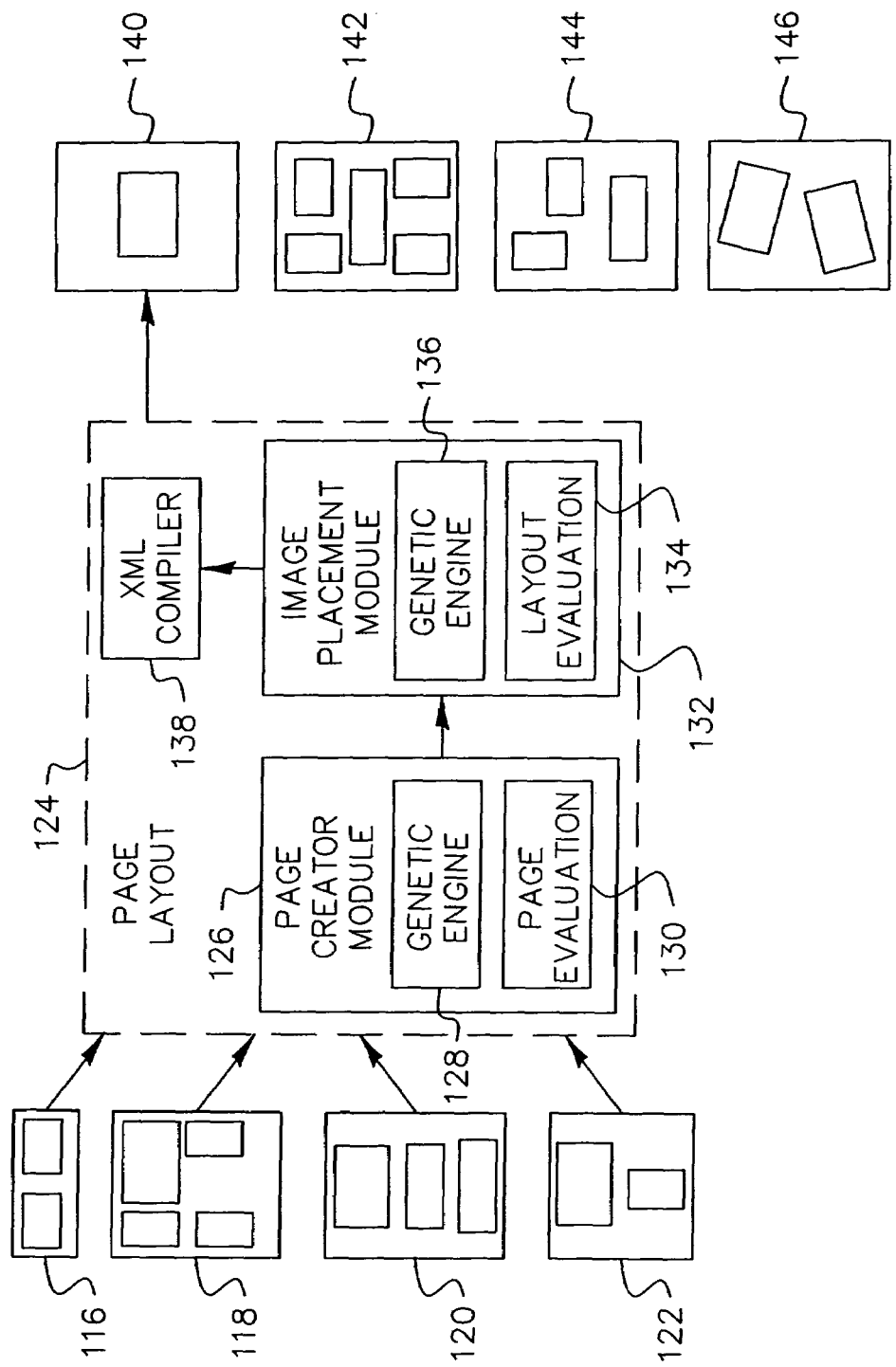
FIG. 7 is a system architecture diagram of the page layout module according to an illustrative embodiment of the present invention.

FIG. 7 illustrates the overall architecture of a page layout system 124 according to an illustrative embodiment of the present invention. The system 124 takes as input a collection of images, which are clustered by events 116, 118, 120, 122 that are to be placed in an album. Being designed to work within the framework of an AAS, the system 124 receives the images that are sorted by event, duplicates and duds have been removed from the collection, and that each image has been assigned an emphasis value indicating the visual appeal of the image. The system produces a series of album pages 140, 142, 144, 146. There are two main system modules corresponding to the tasks outlined above. The Page Creator Module 126 is responsible for assigning each image to an album page. The page groupings created by this module are passed to the Image Placement Module 132, which positions the images on each individual page. Page layouts are specified in a textual form using an Extensible Markup Language (XML) format. Details about this format are available from: *World Wide Web Consortium, Extensible Markup Language (XML)* 1.0, http://www.w3.org/xml, February 1998. These textual descriptions are interpreted by a XML compiler 138 that creates composite images corresponding to each completed album page. Both the Page Creator Module 126 and Image Placement Module 132 make use of genetic algorithms and consists of their own separate genetic engines, 128 and 136 respectively. More particularly, the Page Creator Module 126 comprises a genetic engine 128 and a page evaluation module 130, both of which are implemented in software on a processor as is understood by those of ordinary skill in the art. The Image Placement Module 132 comprises its own genetic engine 136 and a layout evaluation module 134, also implemented in software. In an illustrative embodiment, the present invention is implemented using Visual C++ 6.0 running under Windows 95/98/NT. Although porting to other platforms is readily feasible, as well as implementation in other programming languages and operation on other platforms, understood by those of ordinary skill in the art.

The most important implementation task involves the definition of the fitness function. In defining the fitness for page layout, an approach whereby the fitness is determined directly by the user's visual evaluation would be desirable since the user's subjective interpretation would naturally fit the user's expectations of artistic qualities. The AAS, however, is not principally designed for this type of interaction, as one of the goals of the AAS is to minimize the user input once the images to be placed in the album have been input to the system. This does not, however, limit the application of the present invention page layout system in a more interactive environment.

Due to the subjective nature of album evaluation, some indication of the kind of layouts to be produced is required. Page layout is one of the major tasks of those skilled in the art of graphic design. In defining a means for a user to specify album layout preference, the present invention may rely on the principles of graphic design. Upon surveying a number of graphic design texts, including: Amy Arntson, *Graphic Design Basics, 3rd Ed.*, Harcourt Brace College Publishers, Fort Worth, 1998; Bryan L. Peterson, *Using Design Basics To Get Creative Results*, Northern Lights Books, Cincinnati, Ohio, 1997, and Lori Siebert and Lisa Ballard, *Making a Good Layout*, Northern Light Books, Cincinnati, Ohio, 1992, the contents of which are hereby incorporated by reference thereto, the preferred embodiment of the present invention extracted a number commonly mentioned principles used in evaluation of layout design, which include:

1) Balance—An equal distribution of weight on the page. This principle refers to the symmetry (or asymmetry) of the page with respect to color, size, shape, and texture.
2) Spacing—Describes the basic layout of images on a page. Spacing parameters can be used to describe the feel of a layout in terms of white space, or randomness.
3) Chronology—Describes whether the placement of images on the page matches with the temporal order in which the pictures were taken.
4) Emphasis—What stands out most gets noticed first. Emphasized elements will be the focal point of a page. Although generally achieved using element size, emphasis can also be maintained by use of color, shape, framing, and texture.
5) Unity—Elements that belong together look like they belong together. Unity is achieved by grouping, repetition, and the use of grids (a subdivision of space into rows, columns, and margins).

Each of the Page Creator Module 126 and Image Placement Module 132 judge the fitness of solutions based on a number of different criteria from the categories listed above. The user's preference for each criterion are input to each of the modules, as was noted respecting the AAS system diagram in FIG. 1, where user preferences 12 are input to a user database 20 and subsequently decoded and input to these modules. Generally, these are called value preference parameters. In the scope of the AAS, these preference parameter values can be obtained directly by asking the user when the pictures input for album processing. Once established, these preferences are stored as part of a user profile and extracted whenever a particular user requests an album be made.

In addition to preference parameters, the Page Creator Module 126 and Image Placement Module 132 also utilize a set of importance parameters. These importance parameters define how important it is that the system, for a given criterion, obtains a solution where the layout produced evaluates to the exact value of the preference parameter for that criterion. Another way of looking at this is that the importance parameters indicate how much variation the system is allowed with respect to a given criterion. For example, one of the evaluation criteria for the Image Placement Module is white space. A preference of 1.0 indicates that a layout with a larger amount of white space is desired, whereas a preference of 0.0 is indicates that a layout with very little white space is preferred. Setting the preference for white space to be 0.0 with an importance of 1.0, the system will do everything it can to assure that the layout has as little white space as possible. Note that this is not the same as saying that the importance of white space is 0.0. In the above example, white space is very important, it's just that the user wants very little of it. An importance of 0.0 indicates to the system that it should not even pay attention to the white space preference and, as a result produce a solution with as much or little white space as the system deems appropriate.

Each module has a number of system parameters. These parameters are not directly used during the layout evaluation process. Instead, these parameters provide flexibility for the modules ensuring that they can be used by different albuming systems and in a variety of albuming situations. Examples of system parameters include page dimensions, resolution of the output device, minimum and maximum number of pages per album, etc.

The function of the Page Creator Module is to place each image onto an album page. Alternately, this module can be thought of as being responsible for assigning to each image a page number, where this number corresponds to the page on which the image will be placed. The Page Creator Module makes use of a number of system parameters. These parameters are listed in Table 1 below. As noted above, the values for these system parameters are set before the task of page creation commences. The symbol assigned to each parameter will be used in subsequent sections for referencing the values of these parameters.

TABLE 1

System parameters for Page Creator Module

| Parameter | Symbol | Description |
| --- | --- | --- |
| Emphasis range | $\sigma_{emphasis}$ | Determines the range of "acceptable" emphasis values for the sum of the emphasis values placed on a given page |
| Minimum Pages | $PAGE_{min}$ | The minimum number of pages allowable in the album |
| Maximum Pages | $PAGE_{max}$ | The maximum number of pages allowable in the album |
| Penalty factor for balance | $P_{balance}$ | A scale factor for penalizing unbalanced solutions |

Figure 8:
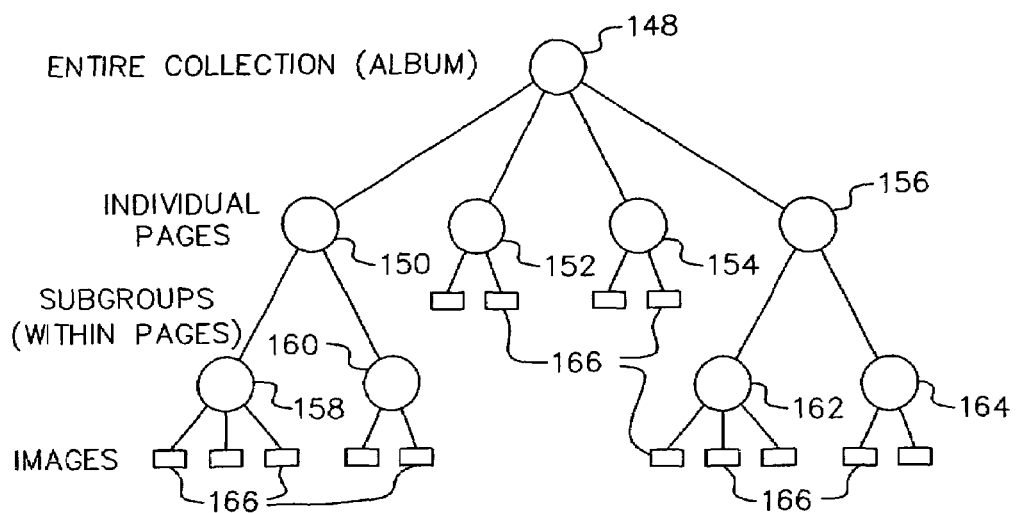
FIG. 8 is a genome diagram of the page creation module according to an illustrative embodiment of the present invention.
Figure 9:
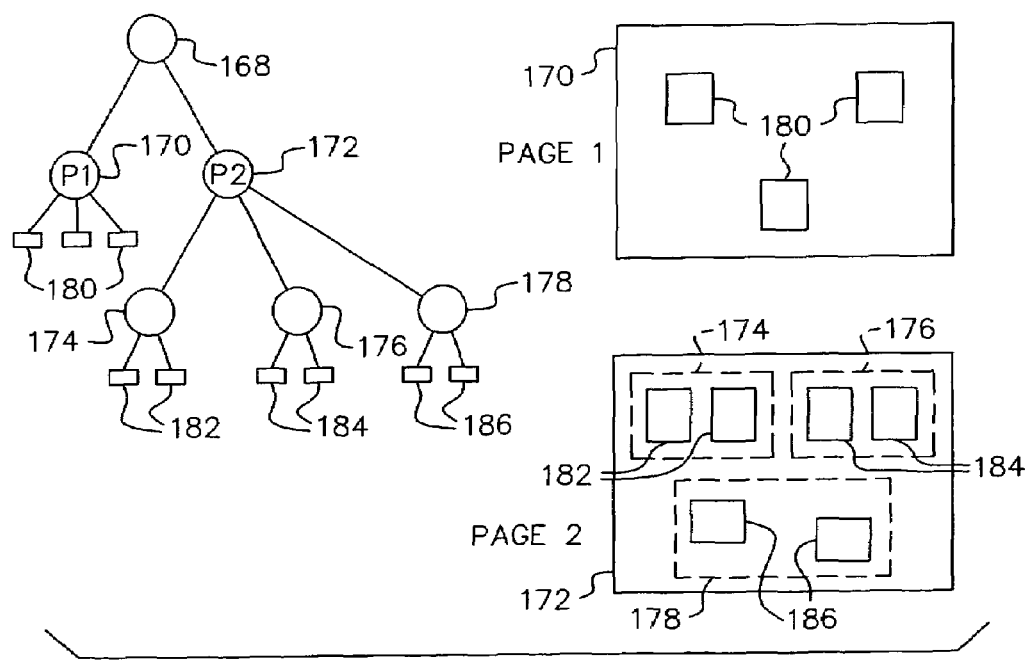
FIG. 9 is a diagram illustrating the encoding of the genome by the page creation module according to an illustrative embodiment of the present invention.

The genome for the page creator module makes use of a tree structure as illustrated in FIG. 8. The root of the tree, node 148, represents the entire photo album. Interior nodes, 150, 152, 154, 156, 158, 160, 162, and 164 represent a structure of hierarchical visual groupings of images, which, in turn, are represented by the leaf nodes 166. However, it is equally suitable to replace this tree based encoding with a simpler data structure based on arrays. The first layer of the tree 148 indicates the partitioning of the album into pages. Nodes below the first layer represent visual groupings within pages 150, 152, 154, 156. The notion of this hierarchical visual grouping is illustrated in FIG. 9, which shows the encoding of an album with two pages and a possible layout solution that maintains the visual grouping relationships. The album is represented by node 168. It comprises two pages 170 and a72. Page One has three images 180. Page Two 172 has three subgroups of images 174, 176, and 178. Each of these subgroups has two images. Subgroup 174 having images 182, subgroup 176 having images 184, and subgroup 187 having images 186.

Standard crossover and mutation operators for tree structures are used by the Page Creator Module. These operators are illustrated in FIG. 3 and FIG. 4, as discussed above. Note that the crossover operator may result in a solution that contains images appearing in multiple places within the tree or in solutions where particular images are omitted. These types of offspring are unacceptable and will be assigned a score of 0.0 during evaluation. Because of this, it is to be understood that the probability of performing a crossover has been lowered thus favoring mutation over crossover when constructing the individuals of future generations.

The determination of fitness used by the Page Creator Module is a combination of a number of factors. First, a solution is evaluated and scored using a number of different criteria. For each criterion, the score achieved by the solution is compared to the preference of the user as defined by the preference parameters supplied to the module. This comparison results in a score indicating the suitability of the solution given the preferences of the user. Finally, the final fitness is obtained by scaling these suitability values on a criterion by criteria basis using the importance parameters, also supplied by the user.

In the following paragraphs, the fitness evaluation process is discussed in more detail. First a discussion of the evaluation criteria and judging procedure is given. Then the means by which the final fitness is obtained is discussed.

Evaluation Criteria—Solutions for the Page Creator Module are evaluated on the following four criteria:

Balance—an evaluation of the balance of the image distribution with respect to the number of images on each page.

Emphasis—an evaluation of whether image emphasis values are equally distributed amongst album pages.

Chronology—an evaluation of how well the distribution of images on sequential pages matches the chronology of the images.

Unity—an evaluation of whether images belonging to the same event and/or sub-event are grouped on the same or subsequent pages.

For each criterion, a score ranging from 0.0 to 1.0 is given to each solution based on the evaluation. Details of the evaluation method for each criterion are given below.

Note that solutions containing a total number of pages outside the range determined by the system parameters $PAGE_{min}$–$PAGE_{max}$, are deemed as unfit solutions and given a final fitness of 0.0. Similarly, solutions that place a single image in multiple places, or solutions that do not consider all images are immediately assigned a fitness of 0.0.

Evaluation of Balance—The balance score is a measure of whether there are an equal number of images on each page. A solution with an equal number of images on all of its pages will obtain a perfect score of 1.0. The score is determined by, first, calculating the mean number of images per page. The average deviation from this mean amongst all the pages in the album is determined and scaled by a penalty factor ($p_{balance}$). Since a perfect score will have a deviation of 0.0, the final score is obtained by subtracting this scaled deviation value from 1.0.

Evaluation of Emphasis—In considering emphasis, the evaluation method attempts to judge how equally distributed the emphasis is amongst the pages in the album. It is undesirable to have too much emphasis on a single page since this will limit the capability of the image placement module to adequately emphasize the images that have high emphasis values. At the same time, a page with too little emphasis on a page will force the image placement module to emphasize images that don't properly deserve emphasis.

In the evaluation of emphasis, it is assumed that the sum of the emphasis values for all of the images on a "perfect" page will equal 1.0. This ideal value of 1.0 could be replaced by some value based on the average of the emphasis values amongst all of the images. An evaluation score for emphasis is obtained by calculating the percentage of pages whose emphasis sum amongst all of the images placed on it, are within an "acceptable" range. This "acceptable range" is defined to be $1.0 \pm \sigma_{emphasis}$ Evaluation of Chronology—In evaluating chronology, each solution is judged based on how closely the order of the images as presented on the pages match that of the chronology of the images. To perform this evaluation, first define the notion of a "chronology range". This range is defined as the range of chronology values for images that should appear on the page if the album was perfectly ordered in time. For example, given an album with three pages, with two images on the first page, four images on the second page, and three images on the final page, the chronology range for each page would be given according to Table 2:

TABLE 2

Chronology ranges

| Page | Chronology range |
|---|---|
| Page 1 | 1-2 |
| Page 2 | 3-6 |
| Page 3 | 7-9 |

When performing the evaluation for chronology, each page is given a score based on the percentage of images that fall within chronology range for the page. The final score is obtained by computing the average of the page scores over all of the pages in the album.

Evaluation of Unity—Evaluation of unity is performed by considering the images belonging to events and sub-events and their proximity to each other when constructing the pages for the album. Two types of scores are computed when evaluating unity:

1) Page Unity Score—Each page is evaluated to determine the percentage of images that belong to the same event that appear on the page. If all the images on a page belong to the same event or sub-event, the page unity score is 1.0. If several events share the same page, a penalty based on the fraction of events of which images appear on the page is applied. A total page unity score is obtained by adding the positive scores and subtracting penalty scores over all of the pages. This total page score is then calculated by dividing the sum by the number of pages in the album.

2) Event Unity—Each event is evaluated to determine the percentage of images in the same event that fall on the same or subsequent pages. For each page that images of a particular event appears, the fraction of images from that page that belong to that event (or sub-event) is determined. If an event totally dominates a page, a score of 1.0 is added to the total Event Unity score. Otherwise, the fraction of images on that page not belonging to the event in question is applied as a penalty and subtracted from the total Event Unity Score. It is acceptable for an event or sub-event to scan multiple pages. For those events that do, a bonus is applied when the pages on which the event images appear are subsequent. A penalty, based on the distance between the pages on which the images appear, is applied if this is not the case. Finally, the final event unity score is scaled by the best possible score given the number of events and the arrangement of the images amongst the pages.

The above scores can be calculated on an event and/or sub-event basis. The system allows one to define whether sub-event checking should be performed. The final unity score is a linear combination of scores for page and event unity for each evaluation performed. Individual scores are scaled equally in determination of the final unity score.

Calculation of Final Fitness—The evaluation algorithms listed above provide raw scores for each one of the evaluation criteria. In determining the final fitness of the solution, both the preferences and the importance of each criteria, as specified by the preference and importance parameters supplied by the user, must also be considered. To determine how well a solution meets the preferences of the user, the difference between the user preference and the raw score is calculated for each criterion. These differences are subtracted from 1.0 resulting in a fitness score for each criteria such that a fitness score of 1.0 indicates a good match with user preferences and a score of 0.0 indicated a bad match with user preferences.

The values of the importance parameters are used to scale the contribution of each criterion to the final fitness score. Given a set of importance parameter values, the best possible score obtainable for a given run of the algorithm can be calculated by assuming the fitness score for each criterion to be perfect (i.e. equal to 1.0). The final fitness score is determined by scaling each of the actual fitness scores for each criteria by the corresponding importance parameter value, summing the results from all of the criteria and dividing this sum by the best possible fitness value obtainable. This final fitness score can be summarized mathematically as:

$$\text{fitness} = \frac{\sum_{i \in \text{criteria set}} I_i(1.0 - \text{abs}(P_i - E_i))}{\sum_{i \in \text{criteia set}} I_i}$$

where 'I' represents the set of importance parameters value (1 per criteria), 'P' represents the set of preference parameter values (1 per criteria) and 'E' represents the set of raw evaluations scores as determined by the procedures outlined above (1 per criteria).

Figure 10:
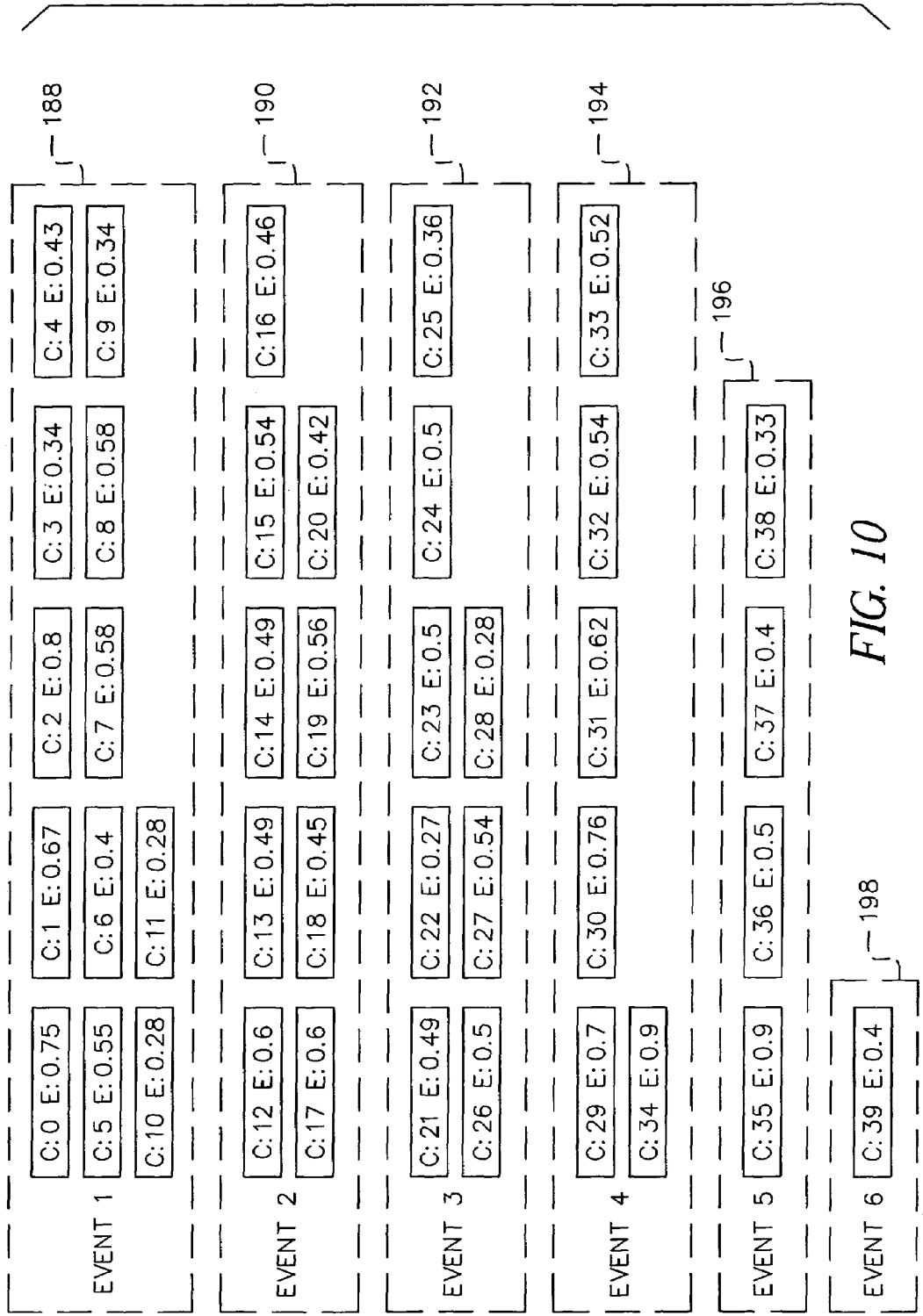
FIG. 10 is a diagram of an exemplary set of images for manipulation by the page creation module in an illustrative embodiment of the present invention.

To illustrate the relationship of these functions and clarify the process generally, what follows are several examples of using the Page Creator Module on a group of images. In each of the examples, the image set presented in FIG. 10 is used. While the images themselves are not present, the data is derived from actual user images and represents a typical user role of film consisting of 40 images taken from a variety of different events. To facilitate viewing the effects of the various evaluation criteria, the images have been labeled with a chronology index (C), giving the relative ordering of the picture with respect to the entire set. An assigned emphasis value (E) is also supplied with each image. Thus, referring to FIG. 10, groups of images from six events are illustrated. Event One 188 includes twelve imaged, chronologically C:0 through C:11. Event two 190 includes nine images, chronologically C:12 through C:20. Event three includes eight images, chronologically C:21 through C:28. Event four 194 includes six images, chronologically C:29 through C:34. Event five 196 includes four images, chronologically C:35 through C:38. Finally, event six 198 includes one image, chronologically C:39. Each image has a emphasis value which can be determined by reference to FIG. 10.

In each of tests illustrated in FIG. 11 through FIG. 16, the effects due to a single criterion are illustrated. In these tests, the preference and importance parameters for the criterion in question are set to 1.0 and the importance parameters for all other criteria is set to 0.0. In each test, the genetic algorithm is run for 10,000 generations, producing solutions with scores ranging from 0.75 through 1.0.

Figure 11:
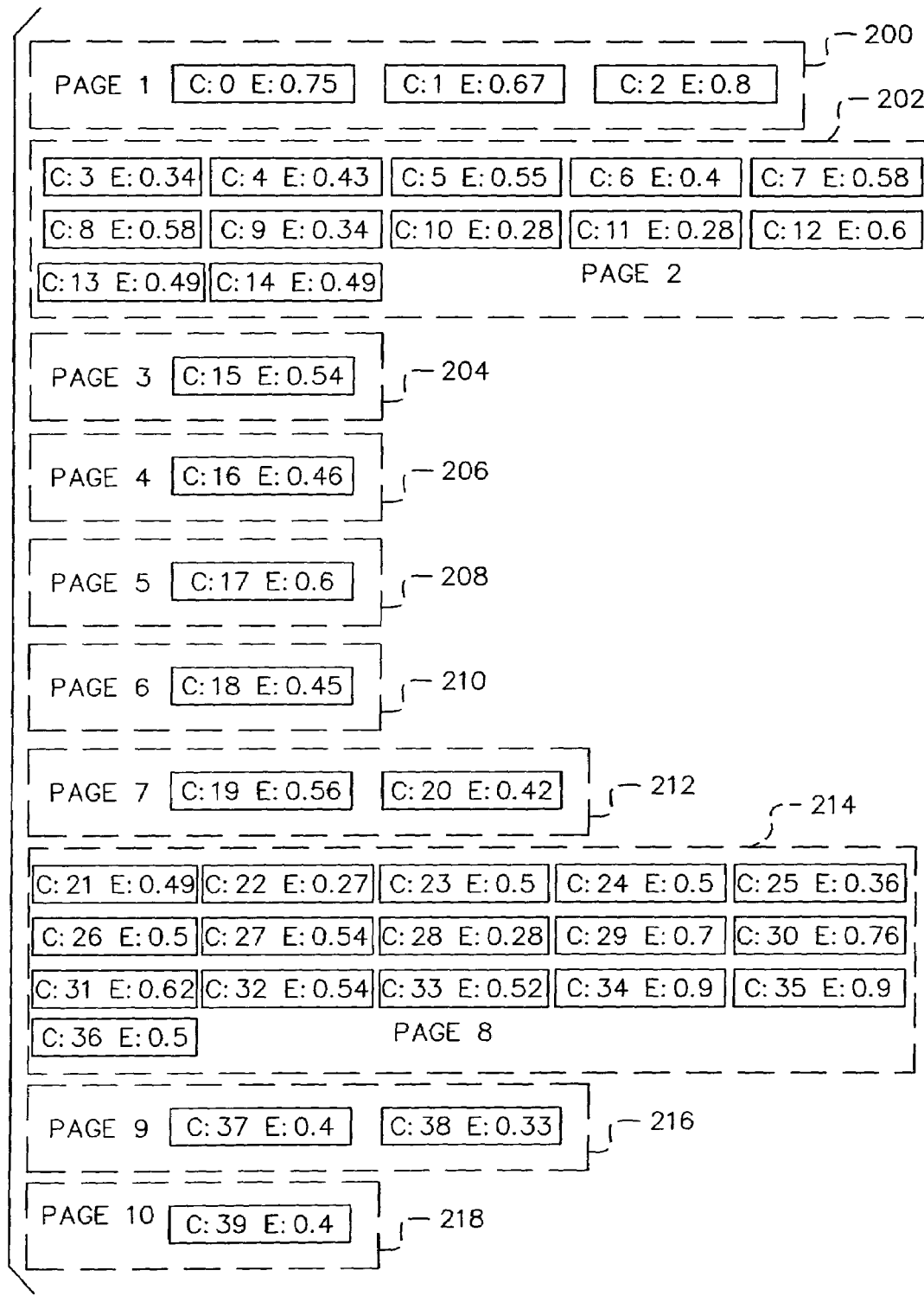
FIG. 11 is a page layout example according to an illustrative embodiment of the present invention.

FIG. 11 illustrates the effect of chronology. A good chronology score is generally not difficult to achieve given that the images are originally presented in chronological order. In fact, the trivial solution is a layout of six pages, where each page contains the images from a single event. In FIG. 11, PAGE$_{min}$ is set to ten as to assure that the Page Creator Module performs some non-trivial work (e.g., it cannot find the trivial solution as six pages is prohibited by this parameter). In the figure, the chronology index is displayed on each image. Referring to FIG. 11, it can be seen that ten pages are output from the Page Creation Module, identified by reference numbers 200, 202, 204, 206, 208,

210, 212, 214, 216, and 218, respectively. Each page has one or more images assigned to it, and the images are in chronological order, as would be expected.

FIG. 12 illustrates the effects of unity Since unity forces images of the same event to be placed next to each other, as with the chronology case, the trivial solution of a six page album with one event per page will receive a perfect score of one. For the test illustrated in FIG. 12, $PAGE_{min}$ is set to 10, once again, to allow the module to perform some non-trivial work. This particular example, though not perfect, tends to keep events together, if not on the same page, on subsequent pages. The output comprised 16 pages. Page 1, 220, has a single image from event six. Page 2, 3, 4, and 5, reference numerals 222, 224, 226, and 228 respectively, have single images from event two. Page 6, 230, has two images from event five. Pages 7 and 8, 232 and 234, have single images from event five. Page 9, 236, has three images from event three. Pages 10, 11, and 12, reference numerals 238, 240, and 242 respectively, have single images from event three. Page 13, 244 has three images from event one. Page 14, 246, has two images from event one. Page 15, 248, has seven images from event one, five images from event 2, two images from event 4, and five images from event four. In this page, all common event images are adjacent to one another. Finally, page 16, 250, has a single image from event 4. This solution received a score of 0.8.

The effects of balance are illustrated in FIG. 13. In this example, no constraints are placed on the minimum or maximum number of pages. Note that pages 2, 4, 5, 6, 7, 9, 13, 16, and 17, identified by reference numerals 254, 258, 260, 262, 264, 268, 276, 282, and 284 respectively, all comprise two images. Pages 3, 8, 10, 11, 12, 14, and 15, identified by reference numerals 256, 266, 270, 272, 274, 278, and 280 respectively, each comprise three images. Page 1, 252 comprises a single image. Thus, a degree a balance is achieved, but without exacting uniformity.

The effects of emphasis are illustrated in FIG. 14. As with the balance test, no constraints were placed on the minimum or maximum number of pages. Note that emphasis values are printed for each image, along with the chronology value. Seventeen pages were generated, identified by reference numerals 284, 286, 288, 290, 292, 294, 296, 298, 300, 302, 304, 306, 308, 310, 312, 314, and 316. Note that images with high emphasis values tend to be placed alone on their own page. Also note that image with lower emphasis values are combined with other similar images onto a single page.

Considering the solutions above, it is clear that unity and chronology tend to lump images together on the same page, whereas emphasis and balance tend to favor solutions where images are more spread out amongst pages. An interesting compromise is reached when combining the effects of two criteria. In FIG. 15, equal importance values are assigned to emphasis and unity (with the importance of balance and chronology set to 0.0). Twenty-one pages, identified by reference numerals 318, 320, 322, 324, 326, 328, 330, 332, 334, 336, 338, 340, 342, 344, 346, 348, 350, 352, 354, 356, and 358, were generated with the image arrangement presented in the drawing figure. This particular solution earned a score 0.81. Note that images belonging to the same event tend to remain together. At the same time, the introduction of emphasis eliminates the tendency to combine a large number of images onto one page (as is evident by reference to Page 15 in FIG. 12). This same observation is also evident in FIG. 16 where balance and chronology are assigned equal importance (with the importance of unity and emphasis set to 0.0). In this case, some sense of unity is achieved indirectly since events are presented in chronological order.

Note in FIG. 16 that thirteen pages are generated, identified by reference numerals 362, 364, 366, 368, 370, 372, 374, 376, 378, 380, 382, 384, and 386.

Now considering the Image Placement Module (item 134 in FIG. 7), its role is to position images on individual album pages once the Page Creator Module has assigned images to particular pages, as discussed above. Given a set of 'N' images to be placed on an individual album page, this module will determine, for each image, the following positioning parameters:

'x' position—The x coordinate of the center of the image.
'y' position—The y coordinate of the center of the image.
's' Scale Factor—The amount of scaling to be applied to the image. Note that the aspect ratios of the images are preserved. Thus, equal scaling is performed in both the horizontal and vertical directions.
'θ' Rotation—Amount of rotation about the center vertical axis of the image.

In the following discussions, the positioning parameters (x, y, s, θ) are be used to indicate the calculated position of an image on the page with each member of the four factors corresponding to a respective value listed above. A set of four positioning parameters define, and are referred to as, the image position.

In performing the solution encoding and solution fitness evaluation, the Image Placement Module makes use of a number of system parameters. The values of these parameters will vary dependent on the application using the module and are set before layouts are processed by the module. A list of these system parameters is given in Table 3. The symbol assigned to each parameter will be used for reference hereinafter.

TABLE 3

System parameters for Image Placement Module

| Parameter | Symbol | Description |
|---|---|---|
| Album Page Width | $W_{page}$ | The width of the album page in pixel units (or physical units). |
| Album Page Height | $H_{page}$ | The height of the album page in pixel units (or physical units). |
| Maximum Rotation | $\theta_{max}$ | Maximum allowable rotation about the center vertical axis of an image. |
| Minimum Scaling | $S_{min}$ | Minimum allowable scale factor that can be applied to an image. |
| Maximum Scaling | $S_{max}$ | Maximum allowable scale factor that can be applied to an image. |
| Minimum white space | $WS_{min}$ | Minimum allowable amount of white space on the page, expressed as a percentage of the total page area. |
| Maximum white space | $WS_{max}$ | Maximum allowable amount of white space on the page, expressed as a percentage of the total page area. |
| Minimum overlap | $OL_{min}$ | Minimum allowable amount of overlap, expressed as a percentage of image area. |
| Maximum overlap | $OL_{max}$ | Maximum allowable amount of overlap, expressed as a percentage of image area. |
| Border deviation | $BDR_{max}$ | Maximum deviation allowed in definition of a natural border created by the image placements. |
| Rotation standard deviation | $\sigma_\theta$ | Standard deviation used in Gaussian scaling of rotation. |

Figure 17:
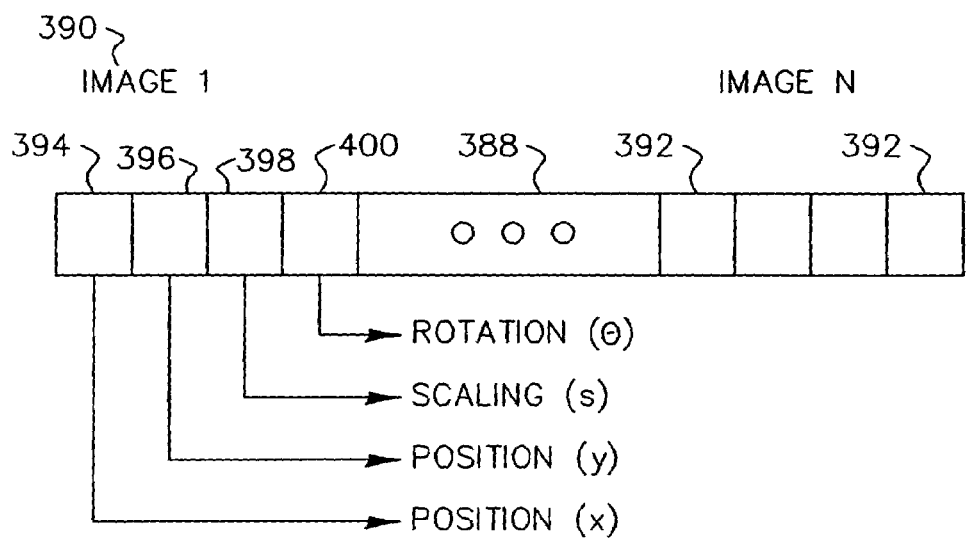
FIG. 17 is a diagram of the genome encoding for the image placement module in an illustrative embodiment of the present invention.

A floating point array is used as the genome for the image placement module. Reference is directed to FIG. 17, which is an illustration of such an array 388 in an illustrative embodiment of the present invention. Each element of the array corresponds to an individual positioning parameter. The first four elements, 394, 396, 398, and 400 specify the Position (x), Position (y), Scaling (s), and Rotation (θ) for the first image 390. Each image is similarly defined through the N$^{th}$ image 392. The complete genome is comprised of the image positions of all images to be placed. Thus, for a page with N images, the length of the genome is four times N.

All elements of the array are floating point values ranging from 0.0 to 1.0. This is to assure that all genes (i.e. array elements) are considered equal when performing genetic operations. The value of the genes for a given image are be referred as gene$_x$, gene$_y$, gene$_g$, and gene$_\theta$ for the value corresponding to the x position, y position, scaling, and rotation respectively. The mappings from these array element values to positioning parameter values for each positioning parameter are given hereinafter.

The x and y positioning parameters give the placement of the center of a given image on the album page. In the genome, this is expressed relative to the total height and width of the page with the origin being the upper-left corner of the page. Appropriate calculations are made by the Image Placement Module to assure that an image placement calculated from given gene values will not result in any part of the image being placed off the boundaries of the album page. The mapping from the gene values for x and y positioning to actual x and y position on the page can thus be given by:

$$x = \frac{W_{image}}{2} + (gene_x \cdot (W_{page} - W_{image}))$$
$$y = \frac{H_{image}}{2} + (gene_y \cdot (H_{page} - H_{image}))$$

where the width and height of the image in pixels are given by W$_{image}$ and H$_{image}$ respectively.

Scaling is expressed in the gene by a linear ramp between the minimum allowable scaling and the maximum allowable scaling. The mapping from gene value to actual scale factor is thus given by:

$$s = s_{min} + (gene_s \cdot (s_{max} - s_{min}))$$

Figure 18:
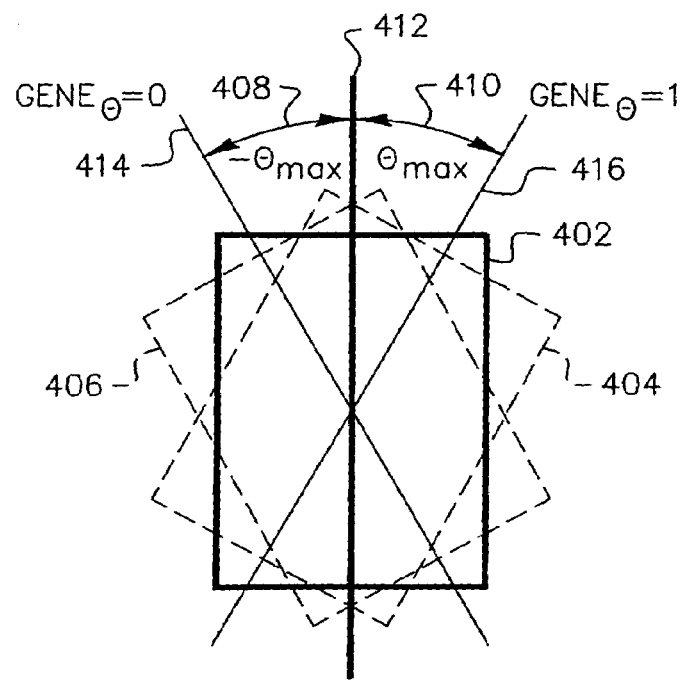
FIG. 18 is a diagram of the encoding of image rotation information in an illustrative embodiment of the present invention.

The rotation positional parameter gives the rotation of an image about the center of the image with respect to the vertical axis of that image. Reference is directed to FIG. 18. An image 402 may be rotated to a counter-clockwise position 406 or a clockwise position 404. Rotation is encoded in the gene by a Gaussian scaling between maximum allowable rotation in the negative (counter-clockwise) direction through angle 408 and the maximum allowable rotation in the positive (clockwise) direction through angle 410. Thus, the vertical axis of the image 412, is rotated through the aforementioned angles to a position 414, or 416. A Gaussian scaling is used as opposed to linear scaling to control the amount of image rotation; favoring small rotations over large amounts of rotation.

The mapping from gene value to actual rotation angle can thus be given by:

$$\theta = \text{SIGN}(gene_\theta - 0.5) \cdot \theta_{max} \cdot \left(1 - e^{\frac{-(gene_\theta - 0.5)^2}{2\sigma_\theta^2}}\right)$$

where SIGN (x) equals 1 if x is positive, −1 if x is negative and 0 otherwise.

In an illustrative embodiment, standard crossover and mutation operators for arrays are used by the Image Placement Module. These operators are illustrated in FIG. 5 and FIG. 6. In additional, a value mutation operator is defined and also used alternately by the module. This value mutation operator will choose a random gene within the array and deviate it's value by a random amount. Care is taken to assure that the gene value remains between 0.0 and 1.0 after the mutation.

Similar to the Page Creator Module, the fitness for the Image Placement Module is a combination of raw evaluations in a number of given criteria considered with respect to the preference and importance parameters supplied from the user preference database. The method for evaluation of fitness is outlined in the following discussion. The evaluation criteria for layout solutions include seven different criteria. These criteria can be categorized as follows.

Spatial Criteria
  White space—an evaluation of the amount of white space on the page.
  Overlap—an evaluation of the amount of image overlap on a page.
  Rotation—an evaluation of the amount of image rotation on a page.
Balance Criteria
  Spatial Balance—an evaluation of how equally distributed the images are on the page.
  Rotational Balance—an evaluation of how equally balanced the rotation of images are.
  Border Symmetry—an evaluation of how well the edges of the images on the page form a natural border.
  Emphasis—an evaluation of how well the scaling of images relate to image emphasis values.

For each criterion, a solution, represented by a genome, is given a score ranging from 0.0 to 1.0. In order to perform the evaluations, a mockup of the page layout is generated by decoding the genome values and positioning rectangles on a two-dimensional grid using a polygon-clipping library. In an illustrative embodiment of the present invention, the generic polygon clipping library according to the reference: Alan Murta, "*A Generic Polygon Clipping Library*", Department of Computer Science, University of Manchester, 1999, the contents of which are hereby incorporated by reference thereto, is used. This mock layout is used to calculate the various area calculations used in the evaluations.

The evaluation of white space involves a score of the white space, which is a measure of the amount of white space on the page and is determined by calculating the percentage of the page area not filled by any images. A score of 0.0 indicates a layout where the images placed on the page take up the entire page area. A score of 1.0 is indicative of an empty page with no images on it (i.e. the entire page is white space). As indicated in Table 3, there are system parameters that limit the acceptable amount of white space allowed. Solutions that result in white space percentages below the minimum or greater than the maximum are tagged as unacceptable solutions and given a final fitness value of 0.0.

In evaluating overlap, the maximum overlap between any two images is considered. The overlap score is defined as the maximum percentage of any image area covered by another image over all of the images placed on the page. Similar to white space, there are system parameters that limit the acceptable amount of overlap allowed. See Table 3, above. Solutions that result in overlap scores below the minimum or greater than the maximum are tagged as unacceptable solutions and given a final fitness value of 0.0.

The rotation score is an indication of the total amount of image rotation on an album page. It is derived by averaging the absolute values of the image rotations over all of the images. This average is scaled by $\theta_{max}$ to achieve a score between 0.0 and 1.0. Note that since the interpretation of the genome encoding for rotation ensures that the rotation for each image will be between $-\theta_{max}$ and $+\theta_{max}$, this rotation evaluation score will never exceed 1.0.

Spatial balance is evaluated by comparing the image areas in the four quadrants of the album page. The page is first split horizontally into equal halves. The amount of page area containing images for both halves are determined and the ratio of the half with the smaller image area over the half with the larger image area is calculated. For a spatially balanced layout, this ratio will be close to 1.0. The same procedure is performed in the vertical direction. The final spatial balance score is the average of the two ratios.

The score for rotational balance is calculated in a manner similar to that of rotation. Like with the rotation evaluation, the rotation balance values over all the images are averaged. However, unlike the evaluation for rotation, the actual rotation values and not the absolute values of these rotations are considered when calculating the average. The rational behind this evaluation is that for a rotationally balanced layout, the summation of all the rotations should amount to 0.0. The rotational balance score is obtained by scaling the calculated signed average by $\theta_{max}$ and then subtracting this value from 1.0. This way, a very rotationally balanced layout, (i.e. one where the signed average of the rotations is 0.0) will produce a score of 1.0. Similarly, a very rotationally unbalanced layout, one where the average of the rotations is close to $\theta_{max}$ will earn a score of 0.0.

The border symmetry score evaluates how closely the edges of the image on the page form a natural boundary. For each edge of the album page (top, bottom, left, right), a border distance is determined by considering the image endpoint closest to the page edge and calculating the distance from the edge to the endpoint. The mean distance amongst the four edges is determined and the average distance from the mean amongst the four edges is calculated. This average is scaled by $BDR_{max}$ and subtracted from 1.0 to generate the final score. Note that if the average distance is greater than $BDR_{max}$, the solution is flagged as unfit and is assigned a final fitness value of 0.0.

The emphasis score measures the proportionality of the size of the images with respect to the emphasis values assigned to the images. The rationale behind this evaluation stems from the notion that images with large emphasis values should take up more space on the page. The comparison made during evaluation is relative to the sizes of all of the images. For each image, the size relative to the largest image in the group is calculated and expressed as a percentage. This percentage is then subtracted from the emphasis value assigned to the image. Then mean difference amongst all the images on the page is calculated and this average is subtracted from 1.0, assuring that an emphasis score of 1.0 indicates a strong positive correlation between image size and emphasis values.

In a fashion similar to the approach used with the Page Creator Module, in determining the final fitness of the solution, both the preferences and the importance of each criterion, as specified by the preference and importance parameters supplied by the user, must also be considered. Thus, the Image Placement Module determines final fitness in the same manner as the page creator module described herein before. The only difference is in the set of criteria considered in performing the evaluation. Thus, final fitness for the Image Placement Module according to an illustrative embodiment of the present invention is described by:

$$\text{fitness} = \frac{\sum_{i \in \text{criteria set}} I_i(1.0 - \text{abs}(P_i - E_i))}{\sum_{i \in \text{criteria set}} I_i}$$

where I represents the set of importance parameters value (1 per criteria), P represents the set of preference parameter values (1 per criteria) and E represents the set of raw evaluations scores as determined by the procedures outlined above (1 per criteria).

Figure 19:
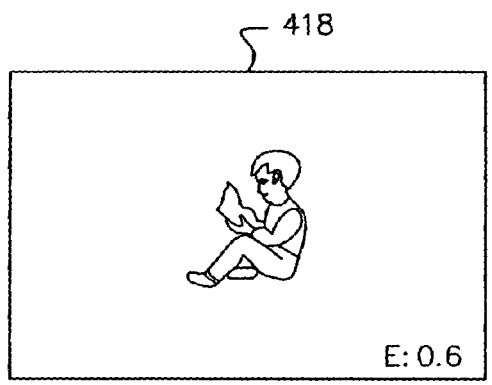
FIG. 19 is an image used in the image placement examples according to an illustrative embodiment of the present invention.
Figure 20:
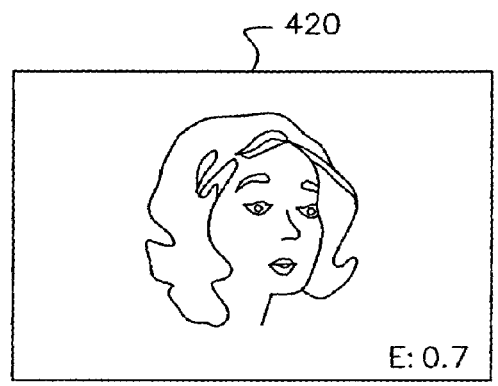
FIG. 20 is an image used in the image placement examples according to an illustrative embodiment of the present invention.
Figure 21:
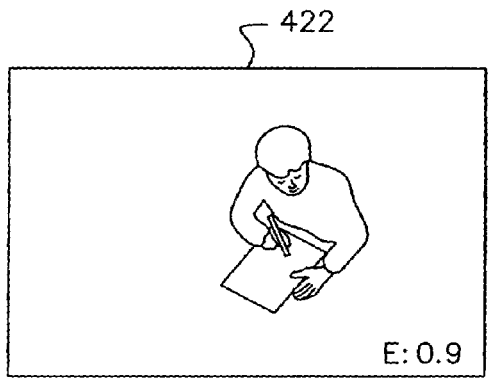
FIG. 21 is an image used in the image placement examples according to an illustrative embodiment of the present invention.
Figure 22:
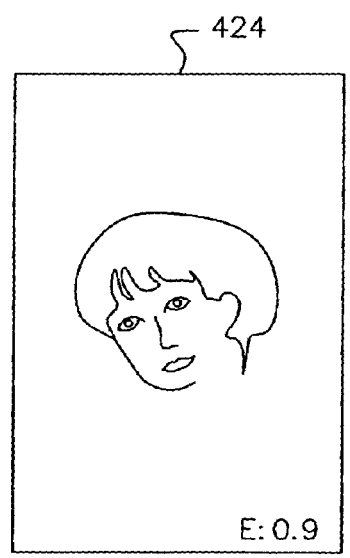
FIG. 22 is an image used in the image placement examples according to an illustrative embodiment of the present invention.

To gain a better understanding of the Image Placement Module layout functionality, it is beneficial to contemplate a series of exemplar page layouts, each of which exercises certain aspects of this module. These layouts appear in FIGS. 23 through 38. In each of the layouts, the illustrative images presented in FIG. 19 (reference numeral 418), FIG. 20 (reference numeral 420), FIG. 21 (reference numeral 422), and FIG. 22 (reference numeral 424) are supplied as input to the Image Placement Module). Note that the values given below each image are the emphasis values for the particular image. In the following example layouts, each criterion will be considered separately to illustrate the effect of manipulating the preference for the criteria in question. In each of the examples, the module ran the genetic algorithm through three hundred generations resulting in layouts with final scores ranging from 0.85-0.95.

Figure 23:
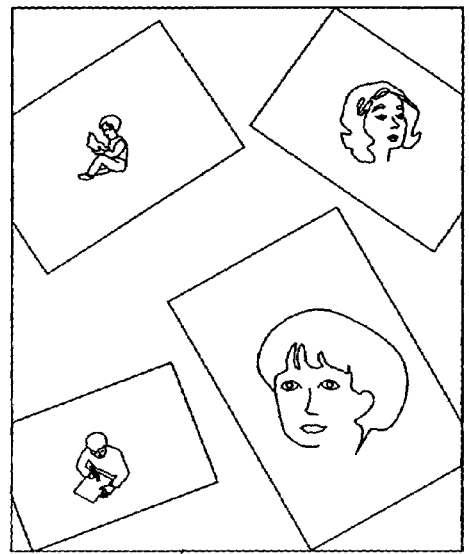
FIG. 23 is a diagram of an image placement example according to an illustrative embodiment of the present invention.
Figure 24:
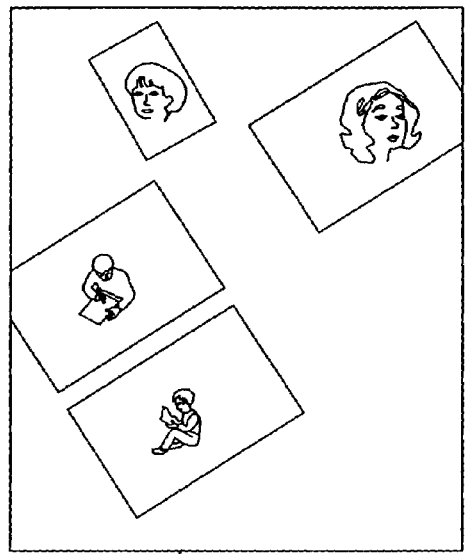
FIG. 24 is a diagram of an image placement example according to an illustrative embodiment of the present invention.

FIGS. 23 and 24 illustrate the effect of the white space preference. Note that $SP_{max}$ has been set to 75% and $SP_{min}$ has been set to 5%. For FIG. 23, image 426, the preference is set to 0.0, and, for FIG. 24, image 428, the preference is set to 1.0.

Figure 25:
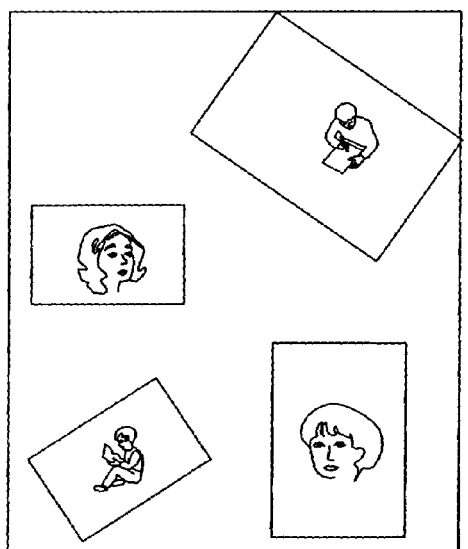
FIG. 25 is a diagram of an image placement example according to an illustrative embodiment of the present invention.
Figure 26:
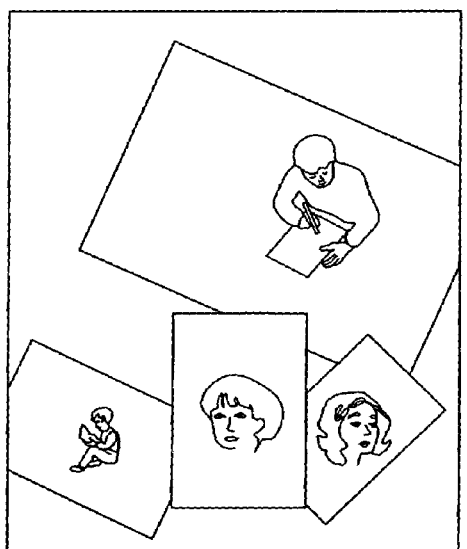
FIG. 26 is a diagram of an image placement example according to an illustrative embodiment of the present invention.

FIG. 25 and 26 illustrate the effect of overlap. In this example, the white space preference is kept constant between the two layouts. The value of $OL_{min}$ is set to be 0% whereas the value of $OL_{max}$ is set at 25%. For FIG. 25, image 430, the preference is set to 0.0, and, for FIG. 26, image 432, the preference is set to 1.0.

Figure 27:
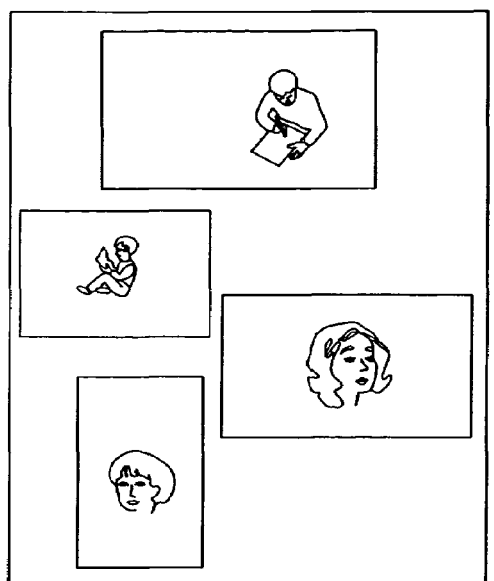
FIG. 27 is a diagram of an image placement example according to an illustrative embodiment of the present invention.
Figure 28:
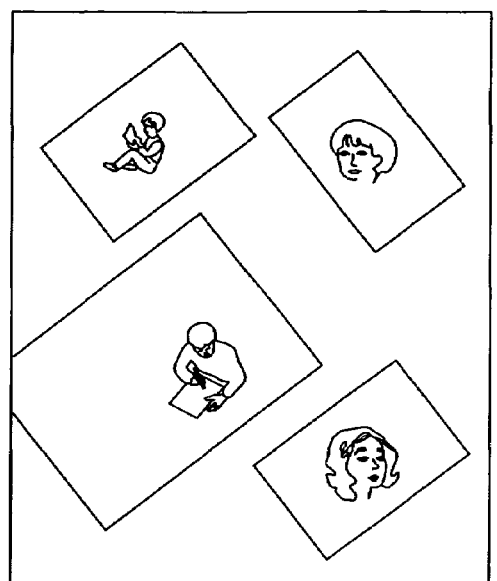
FIG. 28 is a diagram of an image placement example according to an illustrative embodiment of the present invention.

The effect of rotation is illustrated in FIGS. 27 and 28. Once again, the white space preference is kept constant between the two layouts. In addition, the overlap preference is set to 0. The value of $\theta_{max}$ is set at 30 degrees. For FIG. 27, image 434, the preference is set to 0.0, and, for FIG. 28, image 4436, the preference is set to 1.0.

Figure 29:
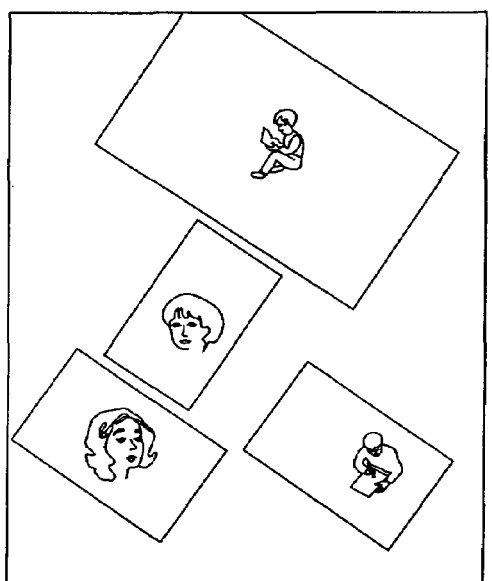
FIG. 29 is a diagram of an image placement example according to an illustrative embodiment of the present invention.
Figure 30:
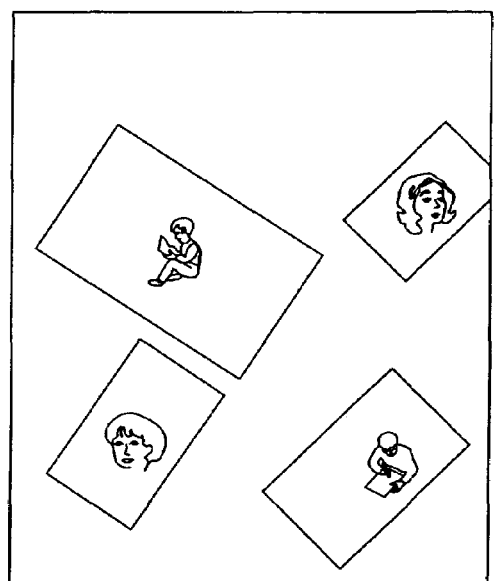
FIG. 30 is a diagram of an image placement example according to an illustrative embodiment of the present invention.

In FIGS. 29 and 30, the effects of rotational balance are shown. For sake of illustration, the rotation preference for both layouts is set to 1.0. For FIG. 29, image 438, the preference is set to 0.0, and, for FIG. 30, image 440, the preference is set to 1.0.

Figure 31:
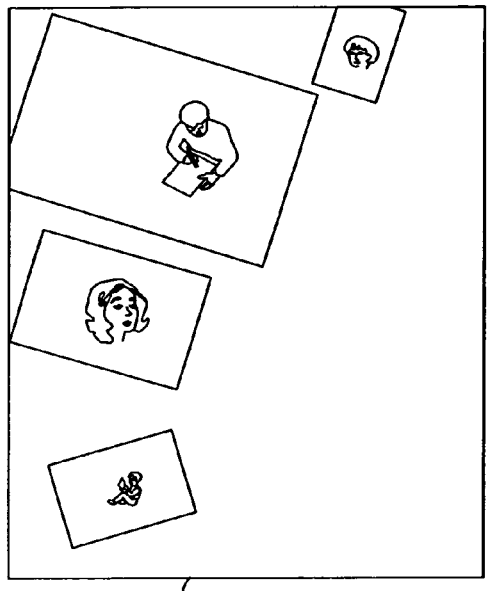
FIG. 31 is a diagram of an image placement example according to an illustrative embodiment of the present invention.
Figure 32:
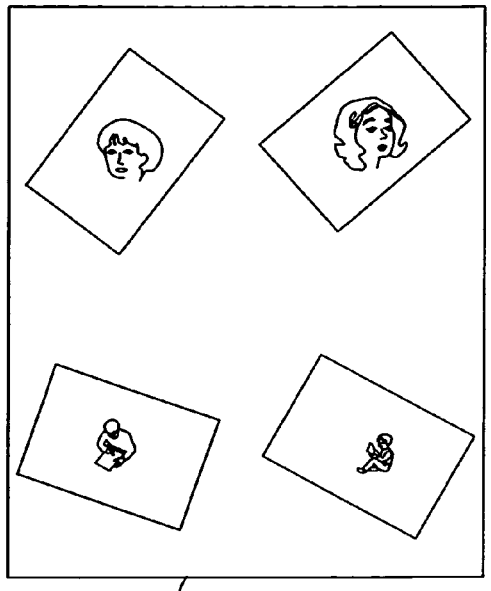
FIG. 32 is a diagram of an image placement example according to an illustrative embodiment of the present invention.

The effects of spatial balance are shown in FIGS. 31 and 32. Note that setting the preference to 0.0 results in a layout where one quadrant of the page is completely empty where the rest have images in them. For FIG. 31, image 442, the preference is set to 0.0, and, for FIG. 32, image 444, the preference is set to 1.0.

Figure 33:
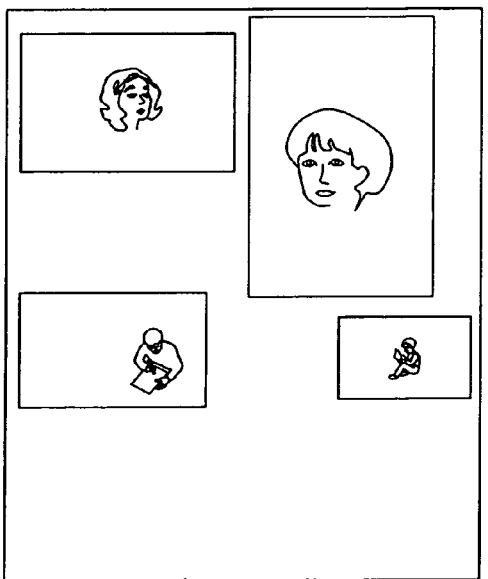
FIG. 33 is a diagram of an image placement example according to an illustrative embodiment of the present invention.
Figure 34:
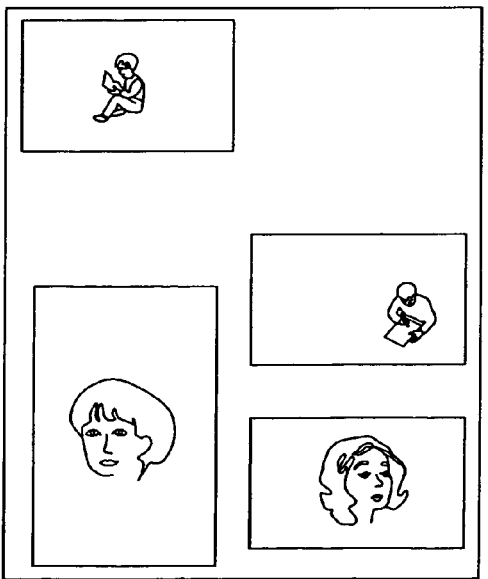
FIG. 34 is a diagram of an image placement example according to an illustrative embodiment of the present invention.

FIGS. 33 and 34 show the effects of border symmetry. In order to emphasize the border effect, the rotation and overlap preferences in this example are set to 0.0. For FIG. 33, image 446, the preference is set to 0.0, and, for FIG. 34, image 448, the preference is set to 1.0.

Figure 35:
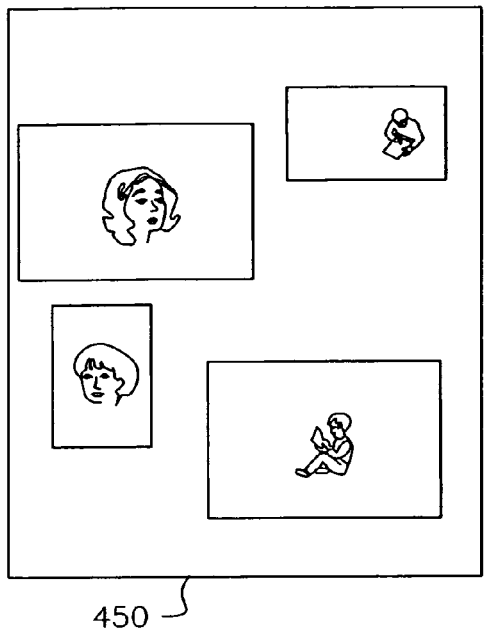
FIG. 35 is a diagram of an image placement example according to an illustrative embodiment of the present invention.
Figure 36:
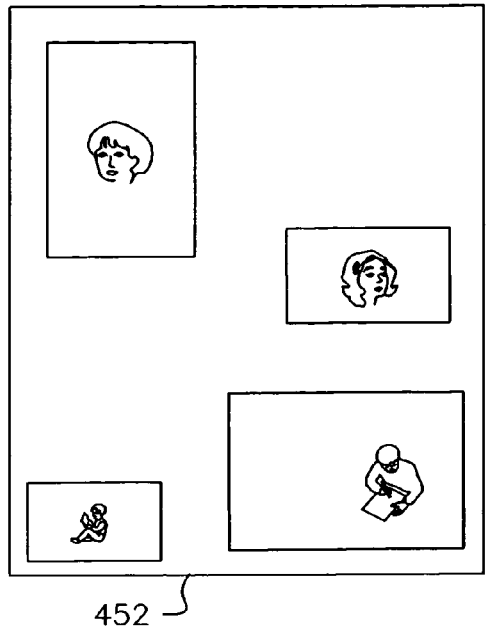
FIG. 36 is a diagram of an image placement example according to an illustrative embodiment of the present invention.

Finally, the effects of emphasis are illustrated in FIGS. 35 and 36. Note that setting the emphasis preference to 1.0 indicates that the user wants a strong relationship between the size of the image and the emphasis value. Considering the method by which emphasis is evaluated, described herein before, setting this preference set to 0.0, indicates to the system that this relationship should be reversed. This is clearly the effect shown in these Figs. considering the emphasis values listed for the reference images from FIGS. 19 through 21. For FIG. 35, image 450, the preference is set to 0.0, and, for FIG. 36, image 4452, the preference is set to 1.0.

Figure 37:
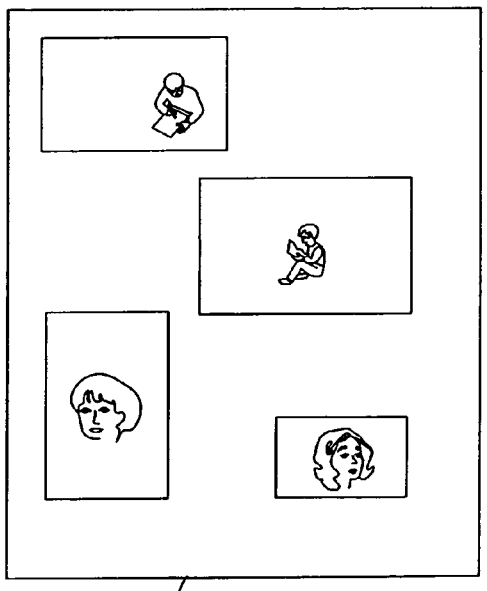
FIG. 37 is a diagram of an image placement example according to an illustrative embodiment of the present invention.
Figure 38:
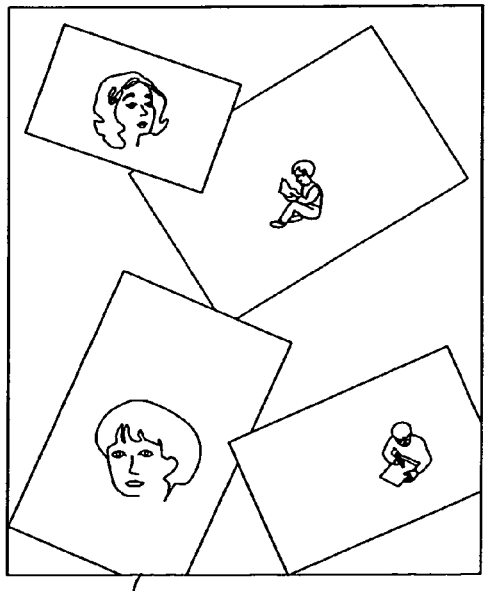
FIG. 38 is a diagram of an image placement example according to an illustrative embodiment of the present invention.

The variety of page layouts that can be produced by the Image Placement Module is best illustrated when modifying several preference parameters at once. In FIGS. 37 and 38, the preferences for white space, rotation, and overlap are all modified between the two layouts. The results are the two layouts illustrated with two entirely different feels to them, FIG. 37, image 454, being very traditional and rigid, FIG. 38, image 456, having more of a whimsical quality to it.

Thus, the present invention has been described herein with reference to a particular embodiment for a particular application. Those having ordinary skill in the art and access to the present teachings will recognize additional modifications, applications and embodiments within the scope thereof. For example, It is therefore intended by the appended claims to cover any and all such applications, modifications and embodiments within the scope of the present invention.

What is claimed is:

1. A digital image album layout system comprising:
a page creator module operable to receive a set of images, a plurality of different user album preferences, and a plurality of album preference importance values, each said album preference importance value indicating a weighting of a corresponding one of said user album preferences relative to the other said user album preferences, and to generate album preference criteria using said user album preferences and album preference importance values, said page creator module having a first genetic engine operable to execute genetic evolution calculations on a first genetic population of album criteria, said page creator module having a page evaluation module operable to test said first genetic population for fitness to said album preference criteria, said page creator module being operable to distribute said images to a plurality of album pages responsive to said testing for fitness to said album preference criteria;
an image placement module operable to receive the set of images, a plurality of different user page preferences, and a plurality of page preference importance values, each said page preference importance value indicating a weighting of a corresponding one of said user page preferences relative to the other said user page preferences, and to generate page preference criteria using said user page preferences and page preference importance values, said image placement module having a second genetic engine operable to execute genetic evolution calculations on a second genetic population of page layout criteria, said image placement module having a layout evaluation module operable to test said second genetic population for fitness to said page preference criteria, said image placement module being operable to distribute said images on respective said album pages responsive to said testing for fitness to said page preference criteria;
wherein said page creator module and said image placement module operate separately.

2. The system of claim 1, wherein the genetic evolution calculations performed by at least one of the first and second genetic engines include the application of a genetic mutation function.

3. The system of claim 1, wherein the genetic evolution calculations performed by at least one of the first and second genetic engines include the application of a genetic crossover function.

4. A system for assigning and placing a plurality of images on album pages, comprising:
means for receiving a plurality of user album preferences and a plurality of album preference importance values, said user album preferences indicating parameter values including at least one of balance, emphasis, chronology, and unity, each said album preference importance value indicating a weighting of a corresponding one of said user album preferences relative to the other said user album preferences,
means for specifying an initial set of page assignments of the images to a first genetic population;
a first genetic engine operable to evolve said first genetic population to produce a present set of image page assignments;
a page evaluation module operable to generate an album fitness function using said user album preferences and album preference importance values and to test said present set of image page assignments according to said album fitness function to determine an album score;
means for outputting said present set of image page assignments if said album score meets an album threshold value;
means for receiving a plurality of user page preferences and a plurality of page preference importance values, said user page preferences indicating parameter values including at least one of white space, overlap, rotation, spatial balance, rotational balance, border symmetry, and emphasis, each said page preference importance value indicating a weighting of a corresponding one of said user page preferences relative to the other said user page preferences,
means for specifying an initial set of placement parameters of the images to a second genetic population in accordance with said outputted set of image page assignments;
a second genetic engine operable to evolve said second genetic population to produce a present set of image placement parameters;
a layout evaluation module operable to generate a page fitness function using said user page preferences and page preference importance values and to test said present set of image placement parameters with a said page fitness function to determine a page score, and
means for outputting said image placement parameters if said page score meets a page threshold value.

5. A method of assigning a plurality of images, having image parameters, to one or more pages in an album, comprising the steps of:
receiving a plurality of different user album preferences and a plurality of album preference importance values, each said album preference importance value indicating a weighting of a corresponding one of said user album preferences relative to the other said user album preferences;
specifying an initial set of page assignments defining the album page assignment for each of the plurality of images;
initializing a genetic population by assigning said initial set of page assignments to genes within an album genome structure;

evolving said genetic population in accordance with a genetic function to produce a present set of page assignments within said album genome structure;

calculating a present set of page criteria according to said present set of page assignments, the image parameters, and a set of album page parameters;

generating an album fitness function using said user album preferences and album preference importance values;

testing said present set of page criteria according to said album fitness function to determine an album score;

repeating said evolving and calculating steps if said album score fails to meet an album threshold value, and outputting image page assignments according to said present page assignment if said album score meets said album threshold value.

6. The method of claim 5 wherein said image parameters include an image event value, image chronology value, and image emphasis value.

7. The method of claim 5 wherein said genome structure is a tree structure.

8. The method of claim 5 wherein said genome structure is selected from one of a tree structure, an array structure, or a list structure.

9. The method of claim 5 wherein calculation of said page criteria includes calculation of an emphasis value range, a page count value, and a balance threshold value.

10. A method of assigning a plurality of images, having image parameters, to one or more pages in an album, comprising the steps of:

receiving a plurality of user album preferences and a plurality of album preference importance values, said user album preferences indicating parameter values including at least one of balance, emphasis, chronology, and unity, each said album preference importance value indicating a weighting of a corresponding one of said user album preferences relative to the other said user album preferences, specifying an initial set of page assignments defining the album page assignment for each of the plurality of images;

initializing a genetic population by assigning said initial set of page assignments to genes within an album genome structure;

evolving said genetic population in accordance with a genetic function to produce a present set of page assignments within said album genome structure;

calculating a present set of page criteria according to said present set of page assignments, the image parameters, and a set of album page parameters;

generating an album fitness function using said user album preferences and album preference importance values;

testing said present set of page criteria according to said album fitness function to determine an album score;

repeating said evolving and calculating steps if said album score fails to meet an album threshold value, and outputting image page assignments according to said present page assignment if said album score meets said album threshold value;

wherein said evolution step genetic function includes a genetic mutation function and a genetic crossover function.

11. A method of assigning a plurality of images, having image parameters, to one or more pages in an album, comprising the steps of:

receiving a plurality of different user album preferences and a plurality of album preference importance values, each said album preference importance value indicating a weighting of a corresponding one of said user album preferences relative to the other said user album preferences, specifying an initial set of page assignments defining the album page assignment for each of the plurality of images;

initializing a genetic population by assigning said initial set of page assignments to genes within an album genome structure;

evolving said genetic population in accordance with a genetic function to produce a present set of page assignments within said album genome structure;

calculating a present set of page criteria according to said present set of page assignments, the image parameters, and a set of album page parameters;

generating an album fitness function using said user album preferences and album preference importance values;

testing said present set of page criteria according to an album fitness function to determine an album score;

repeating said evolving and calculating steps if said album score fails to meet an album threshold value, and outputting image page assignments according to said present page assignment if said album score meets said album threshold value;

wherein said testing step further comprises the steps of:

comparing said present set of page criteria and respective said user album preferences to generate preliminary album scores and scaling said preliminary album scores in accordance with respective said album preference importance values to produce a final album score.

12. The method of claim 11 wherein said page criteria include balance, emphasis, chronology, and unity.

13. A method of arranging one or more images, having image parameters, on an album page, comprising the steps of:

receiving a plurality of different user page preferences and a plurality of page preference importance values, each said page preference importance value indicating a weighting of a corresponding one of said user page preferences relative to the other said user page preferences, specifying an initial set of positioning parameters for each of the one or more images;

initializing a genetic population by assigning said initial set of positioning parameters as genes in a page genome structure;

evolving said genetic population in accordance with a genetic function to produce a present set of positioning parameters within said page genome structure;

calculating a set of present layout criteria, according to said present set of positioning parameters, the image parameters, and a set of page layout parameters;

generating a page fitness function based upon said user page preferences and said page preference importance values;

testing said present set of layout criteria according to said page fitness function to determine a page score;

repeating said evolving and calculating steps if said page score fails to meet a page threshold value; and outputting a page layout according to said present set of positioning parameters if said page score meets said page threshold value.

14. The method of claim 13 wherein said image parameters include an image emphasis value.

15. The method of claim 13 wherein said genome structure is an array.

16. The method of claim 13 wherein said genome structure is selected from one of a tree structure, an array structure or a list structure.

17. The method of claim 13 wherein calculation of said layout criteria includes calculation of at least one of white space area, image overlap, image rotation, spatial balance, rotational balance, border symmetry, and image emphasis values.

18. The method of claim 13 wherein said page criteria include at least one of page size, maximum image rotation, scaling range, white space range, overlap range, and border deviation.

19. A method of arranging one or more images, having image parameters, on an album page, comprising the steps of:
receiving a plurality of different user page preferences and a plurality of page preference importance values, said user page preferences indicating parameter values including at least one of white space, overlap, rotation, spatial balance, rotational balance, border symmetry, and emphasis, each said page preference importance value indicating a weighting of a corresponding one of said user page preferences relative to the other said user page preferences,
specifying an initial set of positioning parameters for each of the one or more images;
initializing a genetic population by assigning said initial set of positioning parameters as genes in a page genome structure;
evolving said genetic population in accordance with a genetic function to produce a present set of positioning parameters within said page genome structure;
calculating a set of present layout criteria, according to said present set of positioning parameters, the image parameters, and a set of page layout parameters;
generating a page fitness function based upon said user page preferences and said page preference importance values;
testing said present set of layout criteria according to a page fitness function to determine a page score;
repeating said evolving and calculating steps if said page score fails to meet a page threshold value; and
outputting a page layout according to said present set of positioning parameters if said page score meets said page threshold value;
wherein said evolution step genetic function includes a genetic mutation function and a genetic crossover function.

20. A method of arranging one or more images, having image parameters, on an album page, comprising the steps of:
receiving a plurality of different user page preferences and a plurality of page preference importance values, each said page preference importance value indicating a weighting of a corresponding one of said user page preferences relative to the other said user page preferences,
specifying an initial set of positioning parameters for each of the one or more images;
initializing a genetic population by assigning said initial set of positioning parameters as genes in a page genome structure;
evolving said genetic population in accordance with a genetic function to produce a present set of positioning parameters within said page genome structure;
calculating a set of present layout criteria, according to said present set of positioning parameters, the image parameters, and a set of page layout parameters;
generating a page fitness function based upon said user page preferences and said page preference importance values;
testing said present set of layout criteria according to said page fitness function to determine a page score;
repeating said evolving and calculating steps if said page score fails to meet a page threshold value; and
outputting a page layout according to said present set of positioning parameters if said page score meets said page threshold value;
wherein said testing step further comprises the steps of:
comparing said layout criteria to layout preference criteria and generating a preliminary page score and
scaling said preliminary page score in accordance with page importance parameters to produce a final page score.

21. The method of claim 20 wherein said layout preference criteria are based upon user preferences.

22. A method of assigning and placing a plurality of images on album pages, comprising the steps of:
receiving a plurality of different user album preferences and a plurality of album preference importance values, each said album preference importance value indicating a weighting of a corresponding one of said user album preferences relative to the other said user album preferences,
specifying an initial set of page assignments of the images to a first genetic population;
evolving said first genetic population to produce a present set of image page assignments;
generating an album fitness function based upon said user album preferences and said album preference importance values;
testing said present set of image page assignments according to said album fitness function to determine an album score;
outputting said present set of image page assignments if said album score meets an album threshold value;
receiving a plurality of different user page preferences, and a plurality of page preference importance values, each said page preference importance value indicating a weighting of a corresponding one of said user page preferences relative to the other said user page preferences,
specifying an initial set of placement parameters of the images to a second genetic population in accordance with said outputted set of image page assignments;
evolving said second genetic population to produce a present set of image placement parameters;
generating a page fitness function based upon said user page preferences and said page preference importance values;
testing said present set of image placement parameters with a page fitness function to determine a page score; and
outputting said image placement parameters if said page score meets a page threshold value;

wherein said evolving of said first genetic ponulation, said generating of said album fitness function, and said testing according to said album fitness function are senarate from said evolving of said second genetic population, said generating of said page fitness function, and said testing with said page fitness function.

* * * * *